US 6,750,926 B2

(12) United States Patent
Ohgiichi et al.

(10) Patent No.: US 6,750,926 B2
(45) Date of Patent: Jun. 15, 2004

(54) LIQUID CRYSTAL DISPLAY DEVICE AND MANUFACTURING METHOD THEREOF

(75) Inventors: Kimitoshi Ohgiichi, Mobara (JP); Ryouichi Ootsu, Mobara (JP); Kazushi Miyata, Mobara (JP); Shinichi Tsuruoka, Oohara (JP); Susumu Niwa, Chonan (JP)

(73) Assignees: Hitachi, Ltd., Tokyo (JP); Hitachi Device Engineering Co., Ltd., Hayano Mobara (JP)

( * ) Notice: Subject to any disclaimer, the term of this patent is extended or adjusted under 35 U.S.C. 154(b) by 145 days.

(21) Appl. No.: 09/798,948

(22) Filed: Mar. 6, 2001

(65) Prior Publication Data

US 2001/0020988 A1 Sep. 13, 2001

(30) Foreign Application Priority Data

Mar. 6, 2000 (JP) ........................................ 2000-061197

(51) Int. Cl.⁷ ............................................. G02F 1/1333
(52) U.S. Cl. .................... 349/40; 349/150; 349/152; 324/770; 345/88; 345/904
(58) Field of Search ...................... 349/40, 152, 150, 349/151, 149; 324/770; 345/88, 904

(56) References Cited

U.S. PATENT DOCUMENTS 5,657,139 A  *  8/1997  Hayashi ........................ 349/40
6,104,449 A  *  8/2000  Takahashi et al. ............ 349/40

FOREIGN PATENT DOCUMENTS

JP       11-338376       12/1999
JP       2000-250071     9/2000

* cited by examiner

Primary Examiner—Tarifur R. Chowdhury
Assistant Examiner—Thoi V. Duong
(74) Attorney, Agent, or Firm—Antonelli, Terry, Stout & Kraus, LLP

(57) ABSTRACT

Drain driver output terminals (lead lines) are divided into six groups (R1, R2, G1, G2, B1, B2) of positive polarity and negative polarity for three primary colors: respective ones are bundled together for connection to drain line common lines; and then, these drain line common lines are drawn out of a drain driver mount region. Gate driver output terminals (lead lines) are divided into three groups (GA, GB, GC) including a front stage and a next stage plus a rear stage; and respective ones are bundled together for connection to gate line common lines. These gate line common lines are drawn out of a gate driver mount region; and then, tests are preformed with probes attached to test terminals provided at such drain line common lines and gate line common lines.

13 Claims, 30 Drawing Sheets

FIG. 8
Signal from CPU
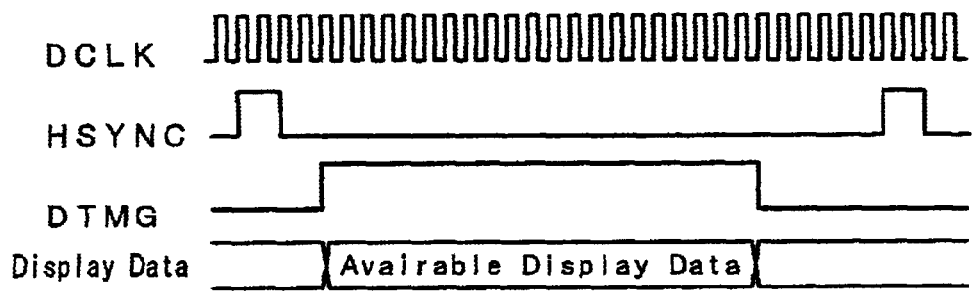
Output for DDR
Signal from CPU
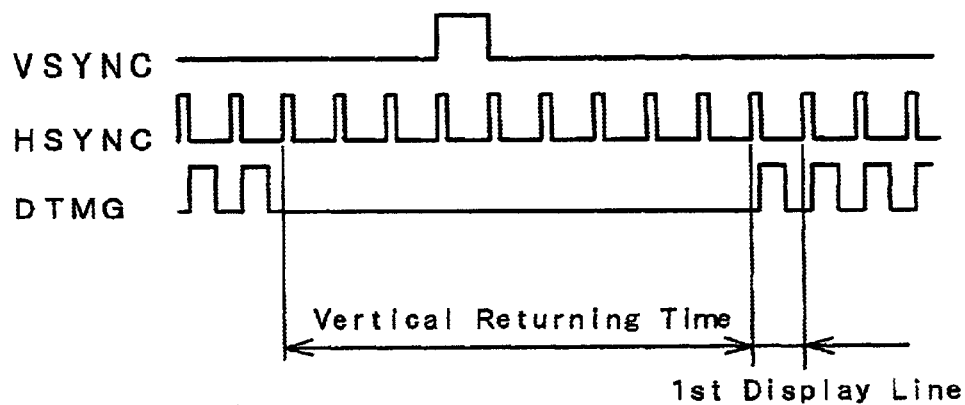
Output for GDR
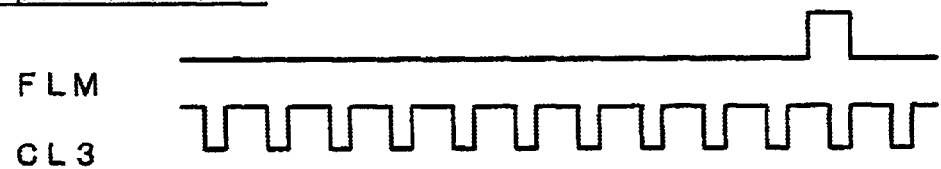

FIG. 11 (a) (Prior Art)
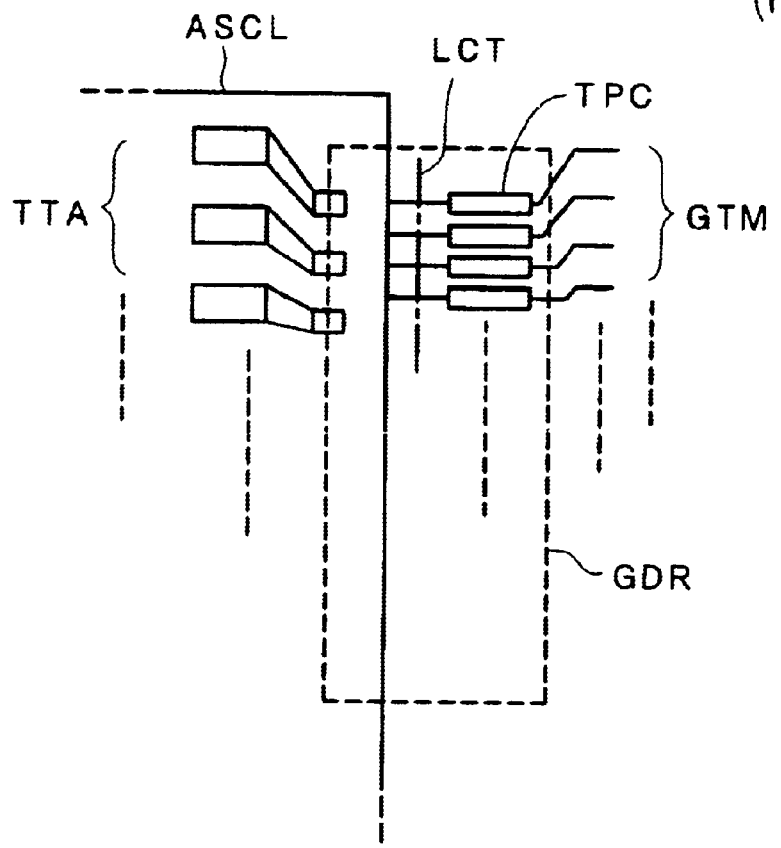
FIG. 11 (b) (Prior Art)
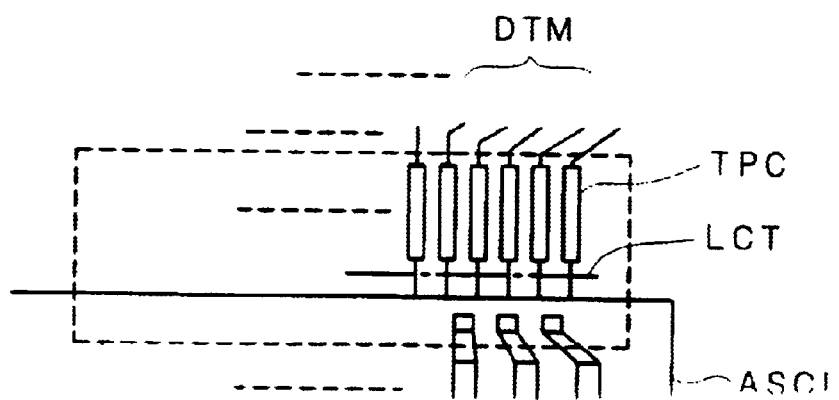

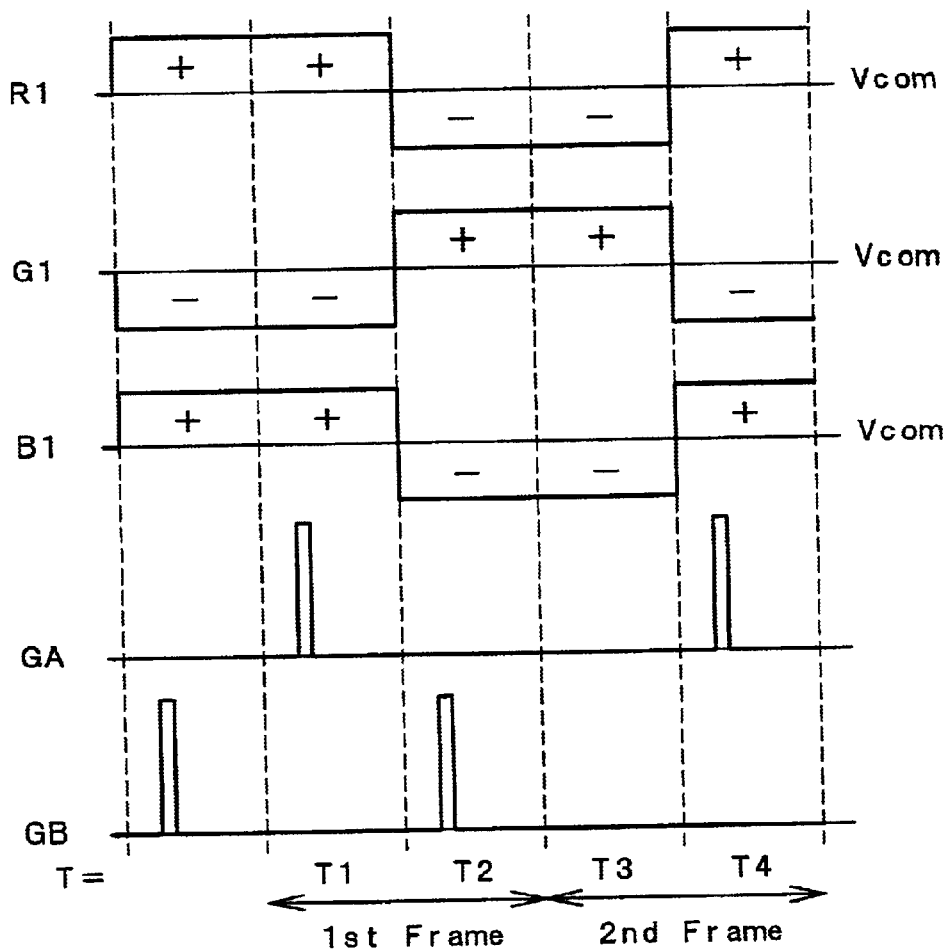

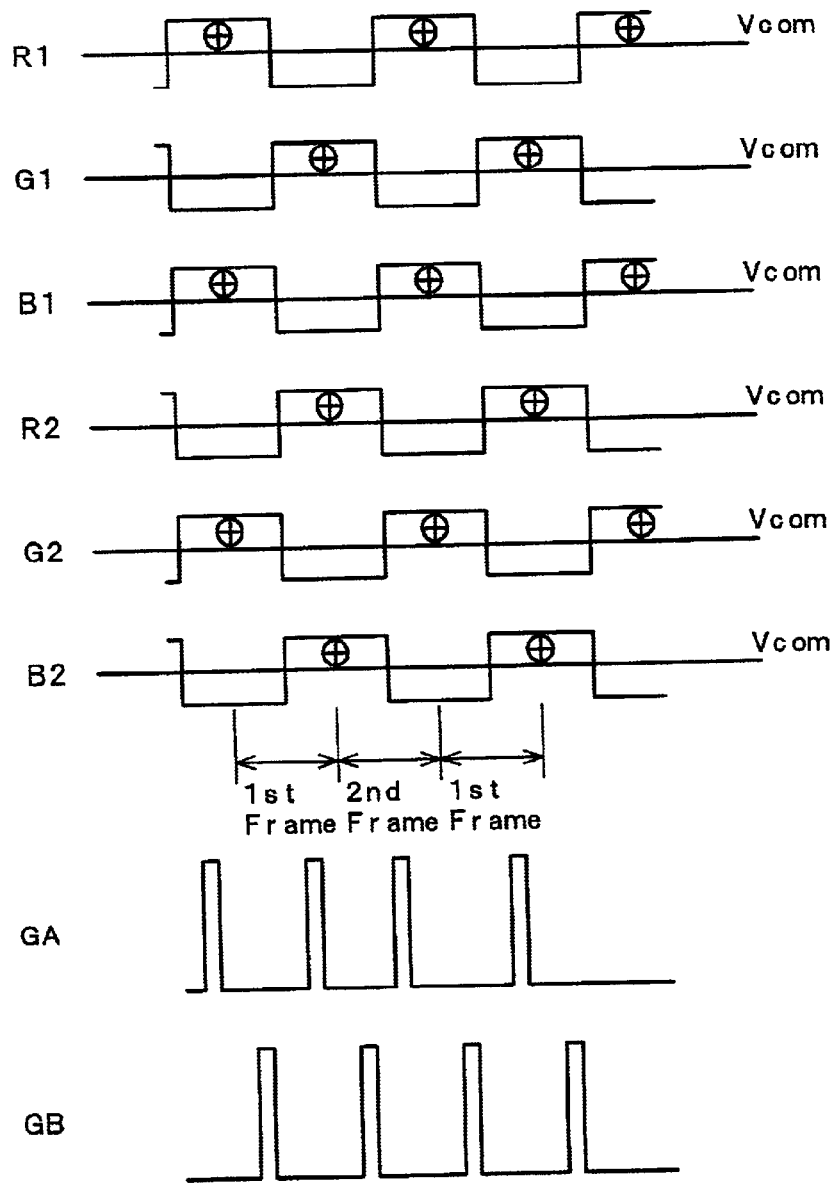

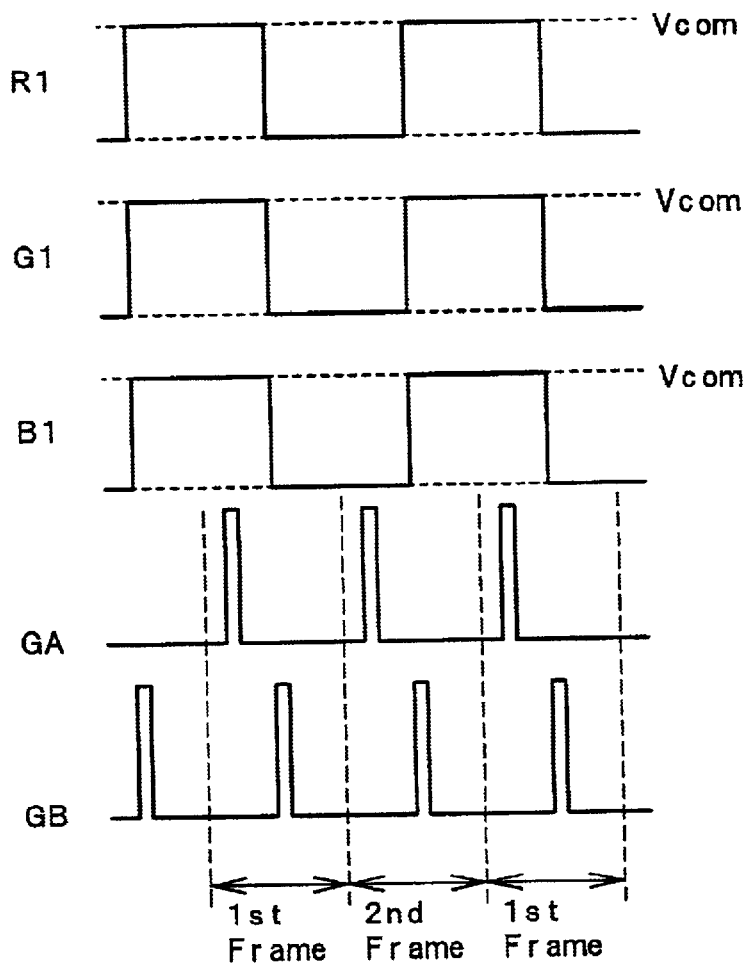

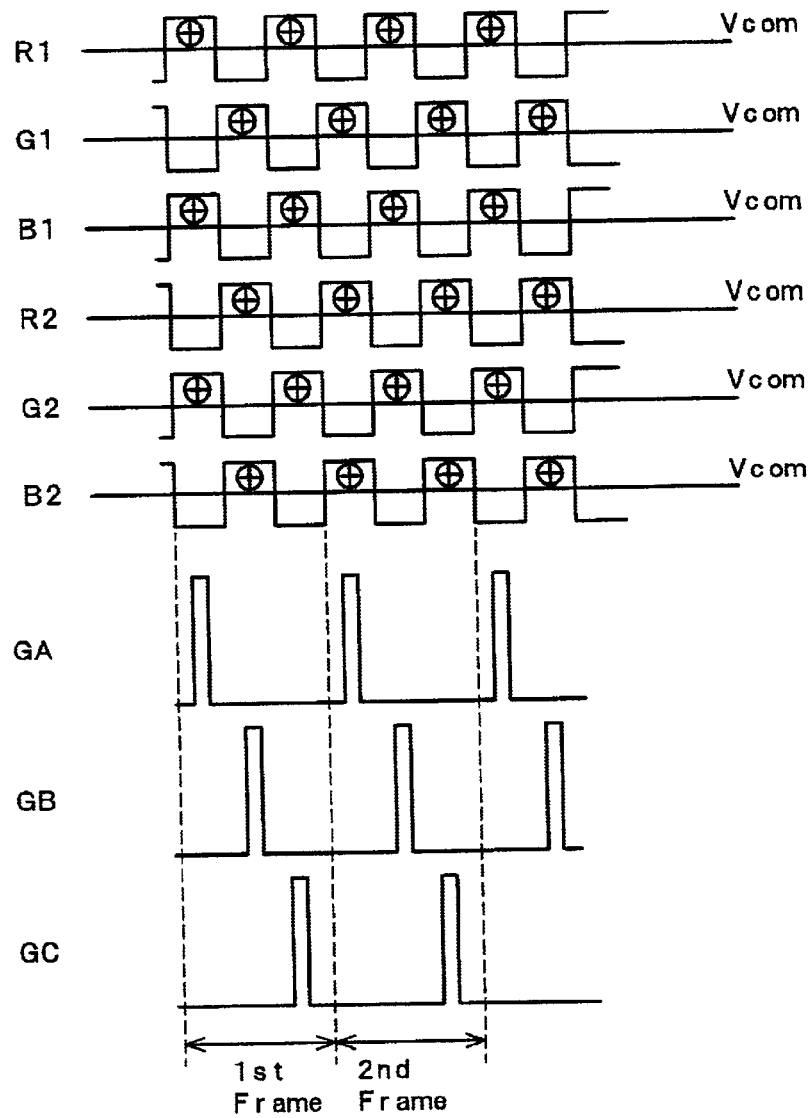

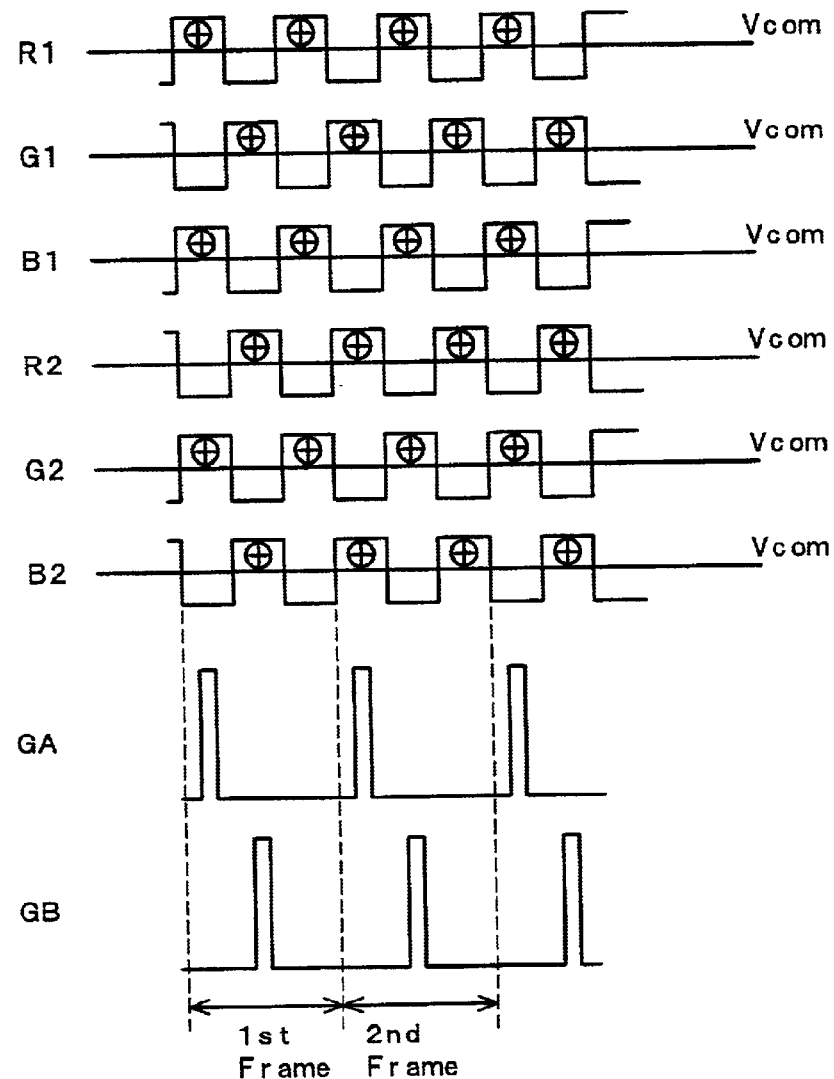

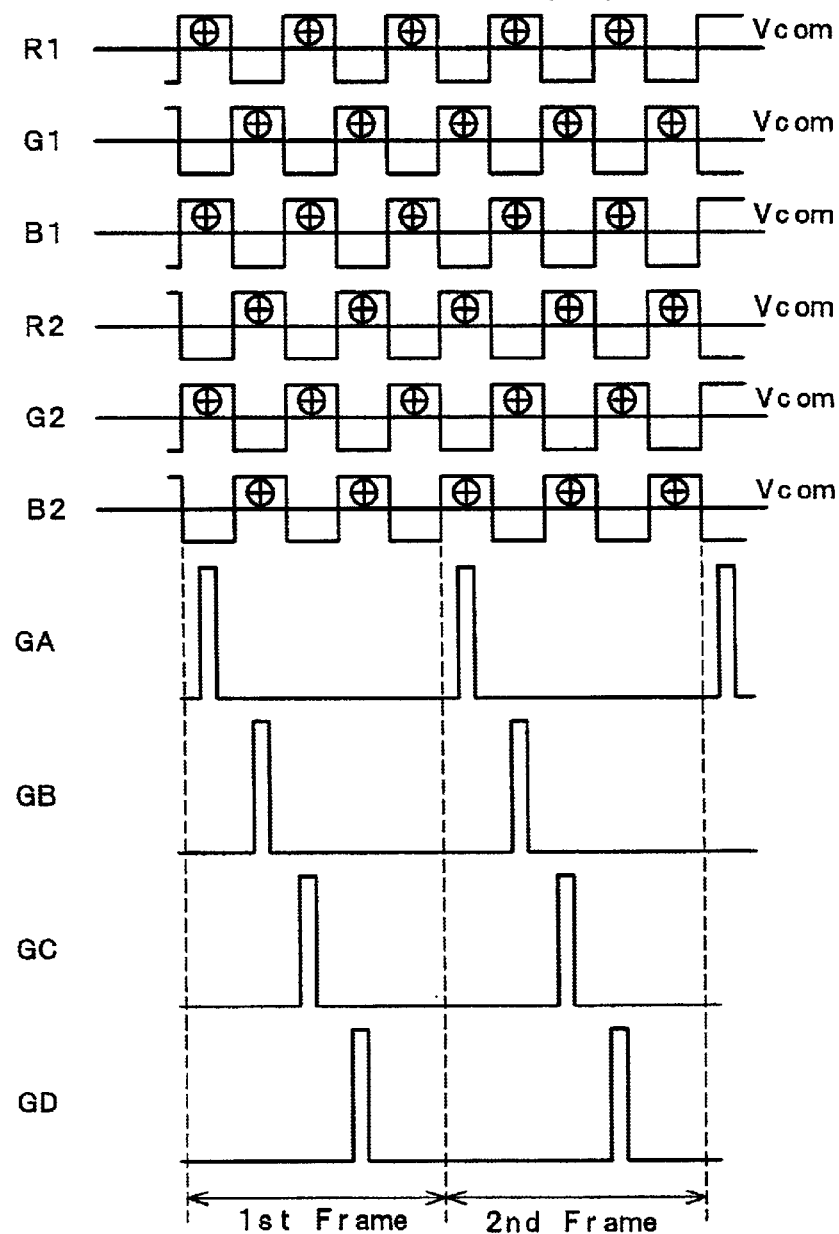

LIQUID CRYSTAL DISPLAY DEVICE AND MANUFACTURING METHOD THEREOF

BACKGROUND OF THE INVENTION

1. Field of the Invention

The present invention relates generally to liquid crystal display devices and, more particularly, to liquid crystal display devices of the thin-film transistor type with test procedures made easier for inspection of functional operabilities of thin-film transistors and connection failures at scan line lead lines and/or signal line leads. This invention also relates to a method for manufacturing the same.

2. Description of the Related Art

Liquid crystal display devices are widely employed as high-precision color display devices for use in notebook computers and display monitor units.

Currently available liquid crystal display devices include those of the simple matrix type using a liquid crystal panel with a liquid crystal layer interposed between a pair of substrate having inside surfaces on which parallel electrodes are formed in a manner that these cross over each other, and the ones of the active matrix type using a liquid crystal display element (referred to also as liquid crystal panel hereinafter) having switching elements for selection in units of pixels on one of a pair of substrates.

Active-matrix liquid crystal display devices include a liquid crystal display device of the so-called longitudinal electric field scheme such as twisted nematic (TN) scheme (generally called TN type active-matrix liquid crystal display device) using a liquid crystal panel with a group of pixel selection electrodes formed on a respective one of a pair of upper and lower substrates, and a liquid crystal display device of the so-called lateral electric field scheme (generally known as IPS type liquid crystal display device) using a liquid crystal panel with such pixel selection electrode group formed on only one of a pair of upper and lower substrates.

Typically a liquid crystal panel making up the former Tn type active-matrix liquid crystal display device is such that liquid crystals are aligned to twist by 90° within an interior space of a pair of substrates (two substrates consisting of a first substrate (lower substrate) and second substrate (upper substrate)), wherein two polarization plates are multilayered on outside surfaces of the upper and lower substrates of such liquid crystal panel respectively, with absorption axis directions being disposed in a cross polarization or "crossed Nicol" fashion and also with light entrance side absorption axes being in parallel or at right angles to a rubbing direction.

In the TN type active-matrix liquid crystal display device thus arranged, incident light becomes linearly polarized light at an incidence side polarization plate upon application of no voltages. This linear polarized light travels along twisting of a liquid crystal layer and if the penetration axis of a light output side polarization plate is identical to the azimuth angle of the linear polarized light then all rays of the linear polarized light are permitted to go outwardly resulting in establishment of a white display (what is called the "normally open mode").

In voltage application events a unit vector's direction (director) indicating the average orientation direction of axes of liquid crystal molecules constituting the liquid crystal layer becomes perpendicular to substrate surfaces while the azimuth angle of incidence side linear polarized light is kept unchanged, thus resulting in coincidence with the absorption axis of the light output side polarization plate to thereby obtain a black display (see "Basics and Applications of Liquid Crystals," issued by Industry Research Association. 1991).

On the other hand, in an IPS type liquid crystal display device with pixel selection electrodes and electrode leads formed on only one of a pair of substrates for permitting switching of its liquid crystal layer in a specified direction extending in parallel to substrate surfaces through voltage application between neighboring electrodes (between a pixel electrode and counter electrode) on this substrate, polarization plates are so disposed as to to provide the black display when no voltages are applied thereto (so called the "normally close mode").

The IPS type liquid crystal display device's liquid crystal layer exhibits homogeneous alignment or orientation parallel to the substrate surfaces in the initial state. Simultaneously the director of the liquid crystal layer in a plane parallel to the substrates is parallel or slightly angled to the electrode lead direction upon application of no voltages, causing the direction of the director of the liquid crystal layer in voltage application events to shift toward a direction perpendicular to the electrode lead direction upon application of a voltage thereto. When the liquid crystal layer's director direction is tilted toward the electrode lead direction by 450° in comparison with the director direction when no voltage are applied thereto, the liquid crystal layer upon application of the voltage causes the azimuth angle of polarized light to rotate 90° as in ½ wavelength plates resulting in coincidence between the light output side polarization plate's transmission axis and the polarized light's azimuth angle thus providing a white display.

This IPS type liquid crystal display device has its feature that changes in color phase and contrast stay less even at viewing angles thus enabling achievement of wide view-field angles (see Japanese Patent Laid-Open No. 505247/1993).

A major approach to attain full color image visualization of the respective types of liquid crystal display devices stated supra is to employ a color filter scheme. This is for realization by subdividing a pixel corresponding to a single dot of color display into three portions and disposing color filters of the three primary color—e.g. red (R), green (G), and blue (B)—at such unit pixels respectively.

Although the present invention is applicable to the several types of liquid crystal display devices stated above, its outline will be explained below with a TN type active-matrix liquid crystal display device being as an example.

As previously stated, in a liquid crystal element (liquid crystal panel) making up the TN type active-matrix liquid crystal display device (referred to simply as active-matrix liquid crystal display device hereinafter for brevity purposes), there are formed on a liquid crystal layer side surface of one substrate of two transparent dielectric substrates typically made of glass plates mutually opposed with a liquid crystal layer interposed therebetween a group of scanning signal lines (referred to as gate lines hereinafter) extending in its "x" direction and being parallel disposed in "y" direction and a group of drain lines (video signal lines) isolated from this gate line group and extending in the y direction while being parallel disposed in the x direction.

A respective one of regions surrounded by these gate line group and drain line group becomes a pixel region in which a thin-film transistor (TFT) for use as an active element (switching element) and a transparent pixel electrode are formed by way of example.

When a scan signal is supplied to a gate line, the thin-film transistor turns on causing a video signal coming from a drain line to be supplied to the pixel electrode via this turned-on thin-film transistor.

Additionally each drain line of the drain line group and each gate line of the gate line group are extended up to the periphery of a substrate to constitute external terminals respectively, to which video drive circuits and gate scan drive circuits—namely a plurality of drive IC chips (semiconductor integrated circuits as will be referred to simply as drive ICs or ICs hereinafter) making up these circuits—are connected respectively, which are separately mounted at the substrate periphery. In other words a plurality of tape carrier packages (TCPs) with these respective drive ICs mounted thereon are externally bonded to peripheral portions of the substrate.

However, since such substrate is designed so that TCPs with drive ICs mounted are externally attached at the peripheral portions thereof, the occupation area of a region (generally called "picture frame") defined between contour lines of a display region as formed of the substrate's cross-over regions of the gate line group and drain line group and an outer frame of the substrate becomes larger undesirably, which is against a demand for reducing or minimizing the outside dimensions of a liquid crystal display module with the liquid crystal display element and an illuminance light source (backlight unit) and other associative optical elements integrated therein together.

Thus, in order to avoid this problem or at least minimize risks, i.e. to fully meet demands for high-density mountability of the liquid crystal display element and also downsizing of the outer size of liquid crystal display module, the so-called flip-chip scheme or alternatively chip-on glass (COG) scheme has been proposed for permitting direct mounting of drive ICs for video driving and drive ICs for scan driving on one substrate (lower substrate) without the use of any TCP components. And, the drive ICs are designed to employ the so-called FCA scheme for permitting electrodes formed on back surfaces of such drive ICs to be directly connected to electrical wiring leads formed on the substrate.

FIG. 10 is a perspective view diagram for explanation of main part of a liquid crystal display device of the FCA mount scheme. This liquid crystal display device is arranged so that a liquid crystal layer is interposed between one substrate SUB1 with a matrix array of thin-film transistors formed thereon and a remaining substrate SUB2 with color filters formed thereon.

The one substrate SUB1 has its one peripheral side along which scan line drive ICs (referred to as gate drivers hereafter) GDR are mounted by the FCA scheme. In addition signal line drive circuit ICs (drain drivers) DDR are similarly mounted by FCA scheme along another side of the substrate.

Outputs of the gate drivers GDR are connected to scan line extension leads GTM whereas inputs thereof are connected to wiring lines of a flexible printed circuit board FPC1. Outputs of the drain drivers DDR are connected to signal line leads DTM; their inputs are coupled to wiring lines of a flexible printed circuit board FPC2.

As shown by arrows In FIG. 10, the flexible printed circuit boards FPC1, FPC2 are such that the flexible printed circuit board FPC1 is bent in a direction BENT1 toward the back surface of one substrate SUB1; then, a curvature portion JT2 of the flexible printed circuit board FPC2 is folded along a fold line BTL in the BENT1 direction and then folded in a direction BENT3 for accordion-like folding onto the back surface of flexible printed circuit board FPC1.

Under this condition, let the flexible printed circuit board FPC2's connector CT4 be connected to a connector, not shown, as provided on the flexible printed circuit board FPC1. An adhesive tape BAT is interposed on the inner surface of the folded portion of the flexible printed circuit board FPC2, resulting in fixture to flexible printed circuit board FPC2.

Note here that reference characters "CHG" and "CHD" designate electronics components such as capacitors and others; ALMG, ALMD denote alignment marks; POL2 is a polarization plate; AR, a display region.

In the liquid crystal display device with the above arrangement, let probes of test/inspection equipment be attached to extension leads of the gate lines and extension leads of the drain lines which are extended from the thin-film transistors formed on one substrate SUB1 to thereby perform several tests for inspection of thin-film transistor characteristics and connection failures at respective electrical leads and turn-on or "lighting" tests after adhesion with the other substrate.

FIG. 11 is a layout explanation diagram of test terminals in one prior art liquid crystal display device, wherein part (a) is a pictorial representation of the gate driver side whereas (b) depicts the drain driver side.

At the part (a), GTM designates gate line extension leads; TPC denotes test terminals; GDR indicates gate driver mount portions (shown by dot lines); LCT is a laser cut line; ASCL, a gate line side static electricity suppression common line; GTM, input terminals of the gate drivers GDR.

In the manufacture of one substrate SUB1 (thin-film transistor substrate), the gate line extension leads GTM are short-circuited by the static electricity suppression common line ASCL for protection against damages of thin-film transistors and wiring leads occurring due to invasion of static electricity. Thereafter, individually cut the gate line leads GTM along the laser cut line LCT; then, attach the probes to the test terminals TPC for inspection of connection failure or unwanted open-circuiting while performing lighting tests upon application of more than one signal thereto.

In part (b), DTM designates drain line extension lines; TPC denotes test terminals; DDR indicates drain driver mount portions (shown by dot lines); LCT is a laser cut line; ASCL, drain line side static electricity suppression common line; TTB, input terminals of the gate drivers GDR.

Similarly, on the drain driver side also, in the manufacture of such substrate, the drain line extension leads DTM are short-circuited by the static electricity suppression common line ASCL for preclusion of damages due to invasion of static electricity at thin-film transistors and wiring leads concerned. Thereafter, individually cut the drain line leads DTM along the laser cut line LCT: then, attach all the probes to the test terminals TPC at a time for open-circuit inspection while performing lighting tests upon application of a signal (s) thereto.

An example of this flip-chip scheme liquid crystal display device is disclosed in Japanese Patent Laid-Open No. 122806/1996.

SUMMARY OF THE INVENTION

In the prior art test terminal layout, the requisite number of gate drivers and drain drivers—in particular drain drivers—increases with growth in high-precision displayability, resulting in a decrease in pitch of output terminals thereof (pitches of GTM and DTM of FIG. 11).

As a result, it becomes impossible to provide sufficiently large widths and lengths of the test terminals (TPC of FIG. 11), which in turn makes it difficult to achieve simultaneous contacting of all probes as in the prior art, leading to occurrence of a problem as to a decrease in inspection accuracy due to probe deviation during open-circuit and lighting tests while externally applying test voltages to the test terminals involved. In addition, production of such probes applied to the output terminals with such narrow pitches is also becoming more difficult.

An object of the present invention is to avoid the problems faced with the prior art to thereby provide a liquid crystal display device having a wiring lead structure capable of execution of a variety of kinds of tests with simultaneous contact of probes to all terminals at a time and also capable of using test/inspection apparatus having probes with common useabilities for multiple types of products by standardization of a pattern of test terminals.

Another object of this invention is to provide a liquid crystal display device capable of facilitating production of the probes at low costs and a method for manufacturing the device.

A further object of the invention is to provide a liquid crystal display device similar to that stated above and capable of suppressing reduction of detection abilities as to display defects during inspection and a manufacturing method thereof.

To attain the foregoing objects the present invention provides as its representative means a technique for subdividing output terminals (lead lines) of drain drivers into six separate groups with regard to the three primary colors of red, green and blue, which groups are of a positive polarity of red, negative polarity of red. positive polarity of green, negative polarity of green, positive polarity of blue, and negative polarity of blue, wherein respective ones are bundled and connected together to drain line common lines, which are taken out of a drain driver mount region for permitting execution of inspection while letting probes be attached to test terminals as provided at the drain line common lines.

In addition, regarding the gate driver side, a technique is provided as a representative means for classifying output terminals (lead lines) of gate drivers into three groups of a front stage, next stage and rear stage or alternatively four groups for letting polarities become reversed in units of respective dots, wherein respective ones are bundled and connected together to gate line common lines, which are taken out of a gate driver mount region for permitting execution of inspection while letting probes be attached to test terminals as provided at the gate line common lines.

Some representative arrangements of the present invention will be set forth below.

(1) In a liquid crystal display device including:
   a pair of substrates with a liquid crystal layer interposed therebetween, one of said substrates having thereon a matrix array of thin-film transistors, pixel electrodes as driven by the thin-film transistors, and a pattern of scanning lines and signal lines for supplying the thin-film transistors with voltage signals used for pixel formation, a remaining one of said substrates having color filters of three colors of red and green plus blue, the one substrate also having a peripheral si de with scan line lead terminals provided and another peripheral side with signal line lead terminals provided;
   a scan line drive IC mount region and signal line drive IC mount region having output terminals connected to respective ones of said scan line lead terminals and said signal line lead terminals of the liquid crystal panel while permitting direct mount of more than one scan line drive IC and more than one signal drive IC respectively: and
   more than one static electricity suppression common line provided in a cut removal region for commonly connecting said scan line lead terminals and signal line lead terminals together,
   the device is specifically arranged to comprises:
      six signal line side common lines provided in the signal line drive IC mount region of the signal line lead terminals connected to said static electricity suppression common line, for connection with six terminal groups as divided from the signal line lead terminals in a way such that the groups are of positive polarity of red, negative polarity of red, positive polarity of green, negative polarity of green, positive polarity of blue, and negative polarity of blue; and
      test pads provided on said one substrate in an area excluding said signal line drive IC mount region for connection to said six signal line side common lines.

With such an arrangement, it is possible to enlarge the width and length plus pitch of test pads for connection to the signal line leads, thus making it possible to make easier production of the probes, resulting in an increase in contact accuracies.

(2) The test pads of said six signal line side common lines are disposed in the cut removal region of said one substrate.

It is possible to standardize patterns of the test pads, thereby enabling the intended inspection of liquid crystal display devices of multiple types of products to be done by use of test apparatus or equipment having a common probe or probes.

(3) In a liquid crystal display device including:
   a pair of substrates with a liquid crystal layer interposed therebetween, one of said substrates having thereon a matrix array of thin-film transistors, pixel electrodes as driven by the thin-film transistors, and a pattern of scanning lines and signal lines for supplying the thin-film transistors with voltage signals used for pixel formation, a remaining one of said substrates having color filters of three colors of red and green plus blue, the one substrate also having a peripheral side with scan line lead terminals provided and another peripheral side with signal line lead terminals provided;
   a scan line drive IC mount region and signal line drive IC mount region having output terminals connected to respective ones of said scan line lead terminals and said signal line lead terminals of the liquid crystal panel while permitting direct mount of more than one scan line drive IC and more than one signal drive IC respectively; and
   more than one static electricity suppression common line provided in a cut removal region for commonly connecting said scan line lead terminals and signal line lead terminals together,
   the device comprises: three scan line side common lines provided in the scan line drive IC mount region of the scan line lead terminals as connected to the static electricity suppression common line, for connection with three groups being divided from the scan signal line lead terminals and having a front stage and next stage plus rear stage or alternatively four terminal groups as divided therefrom in order to let the polarity become reversed in units of dots;

six signal line side common lines provided in the signal line drive IC mount region of the signal line lead terminals connected to said static electricity suppression common line, for connection with six terminal groups as divided from the signal line lead terminals in a way such that the groups are of positive polarity of red, negative polarity of red, positive polarity of green, negative polarity of green, positive polarity of blue, and negative polarity of blue; and test pads provided on said one substrate in an area excluding said scan line drive IC mount region and said signal line drive IC mount region for being associated with said three or four scan line side common lines and said six signal line side common lines respectively.

With this arrangement, it is possible to enlarge the width and length plus pitch of test pads for connection to the signal line leads, thus making it possible to make easier production of the probes, resulting in an increase in contact accuracies.

(4) The test pads of said three or four scan line side common lines and said six signal line side common lines are disposed in the cut removal region of said one substrate.

(5) The test pads of said three or four scan line side common lines and said six signal line side common lines are laid out with equal intervals in the cut removal region of said one substrate.

It is possible to standardize patterns of the test pads including scan lead lines also, thereby enabling the intended inspection of liquid crystal display devices of multiple types of products to be done by use of test apparatus or equipment having a common probe or probes.

(6) Said remaining substrate has thereon more than one counter electrode, the test pads of said three or four scan line side common lines and said six signal line side common lines are disposed in the cut removal region of said one substrate, and a test pad for connection to a lead line of the counter electrode is disposed along with the test pads of said three or four scan line side common lines and said six signal line side common lines.

It is possible to further promote standardization of patterns of the test pads including scan lead lines also, thereby enabling the intended test of liquid crystal display devices of multiple types of products to be done by use of test apparatus or equipment having a common probe or probes.

(7) Said one substrate has thereon more than one counter electrode, the test pads of said three or four scan line side common lines and said six signal line side common lines are disposed in the cut removal region of said one substrate, and a test pad for connection to a lead line of the counter electrode is disposed along with the test pads of said three or four scan line side common lines and said six signal line side common lines.

Since it is possible to dispose those lead lines of counter electrodes required for turn-on or "lighting" tests also in the form of a standard pattern along with the test pads of the scan line side common lines and signal line side common lines, it becomes possible to further promote standardization of the test pad patterns, thereby enabling the intended test of liquid crystal display devices of multiple types of products to be done by use of test apparatus or equipment having a common probe or probes.

One significant feature of the present invention as disclosed and claimed herein lies in separation of the signal side common lines at least in units of respective colors of the color filters in the way stated previously. This invention is not the one that excludes arrangements for performing inspection while causing only the same signal to input to a video signal line concerning each color in any events. However, separating the signal side common lines at least in units of colors of the color filters as stated above makes it possible to reduce probe costs due to reduction of the requisite number of test pads to thereby enable achievement of tests with colors being displayed while at the same time enabling execution of the intended test procedure with high accuracies. In cases where the color filters are of the three primary colors of red, green, and blue, any kinds of tests become available with respect to almost every color to be displayed at products through individual inspections of red, green and blue due to lighting in units of respective colors in addition to white displaying with all colors being brightened at a time, and further lighting while controlling the gray-scale gradation levels of each color.

This means that color purity tests of respective colors become possible, which is a significant advantage of the arrangement incorporating the principles of the invention. Further, demonstrable improvement in test accuracies of display irregularities is realized, which is an effect that will no longer be attained by exclusive use of all-color simultaneous lighting schemes. The color filters are formed by a process having the steps of performing deposition and exposure plus development separately in units of colors thereof or alternatively by letting the individual colors be impregnated. Accordingly in-plane uniformity or distribution within a plane of film thickness will take place in units of respective colors. In the case of lighting all colors at once, influences of these will normally become inappreciable. For example, in case only the film thickness of red locally changes, the resultant influence of such red film thickness's local change upon brightness or luminance during simultaneous lighting of all of the three colors of red, green and blue becomes $\frac{1}{3}$ of that during uni-color lighting of red. Accordingly, the only use of all-color simultaneous lighting would result in occurrence of luminance irregularities—in particular, a decrease in inspection sensitivities as to color irregularities, which leads to risks of outflow of defective products into the market. With the instant invention, it is possible by separating the signal side common lines at least in units of respective colors of the color filters in the way stated supra to establish tests with the colors being lit individually, which in turn makes it possible to realize probe cost reduction and test cost reduction plus high-precision product's lighting tests while retaining test accuracies concerning luminance and color irregularities.

Although this test scheme is advantageous especially for FCA, similar results are also obtainable in TCP schemes through separation of the signal side common lines at least in units of colors of the color filters.

Another significant feature of the invention is that the signal side common lines are separated at least in units of colors of the color filters and for use as positive and negative polarities. Whereby, if the color filters are of three colors by way of example, then the resulting signal side common lines become six lines. Currently available liquid crystal display device drive methods include two major ones: a common inversion driving method, and dot inversion drive method. The common inversion drive is such that at least three signal line side common lines are employed as discussed above due to the fact that in most cases the pixels neighboring in a scan signal line extension direction are the same as each other in polarity relative to the reference signal potential. On the contrary, the dot inversion drive method is such that neighboring pixels in the scan signal extension direction are ordinarily driven in such a way that these are of opposite polarities relative to the reference signal potential. Due to this, in the case of using three signal line side common lines in dot inversion events, six certain pixels neighboring in the scan line extension direction become "+−++−+" by way of example—in this case, any intended polarity inversion is no longer realizable between B and R. Even in this case, the above-noted detection accuracies of luminance/color irregularities can be maintained almost perfectly. Regrettably this advantage does not come without accompanying a penalty which follows: it becomes difficult to accurately inspect flicker, i.e. on-screen flickering, to be checked during lighting test procedure. Generally this flicker will become problematic only with special patterns or only at special timings, which is less in influence during real in-use events than the above-noted color/luminance irregularities; however, if such flicker stays at levels greater than a level defined by clients then a product with the flicker must be regarded as a defective one. Accordingly, with the invention, separating the signal side common lines in units of colors of the color filters and for use as the positive and negative polarities, e.g. employing six signal side common lines for use with color filters of the three primary colors, makes it possible to cause an array of six pixels of RGBRGB to have reversed polarities between adjacent ones of them in a pattern of "+−+−+−" by way of example.

Further, the flicker inspection accuracy in particular is variable depending upon the influence of a very small voltage difference between pixels; thus, it is required to control any possible delays of signal waveforms during inspection. Thus it is desirable that an increased number of test pads for input of test signals to signal line side common lines be provided with respect to each signal line, which number is given as (n−1)/2 or more where "n" is the number of pads per unit region, which may be a chip mount region or alternatively a region with an ensemble of signal wiring leads provided therein. In addition, to suppress probe cost increases, it is desirable that the pad number be set at 2×(n+1) or less.

It is also desirable that the number of test signal terminals for inputting test signals to scan signal lines is greater than the number of test signal terminals for input of test signals to video signal lines. This is based on a requirement for reducing input resistivities of the video signal line side while taking account of the fact that execution of the intended test/inspection with the above-noted arrangements requires that the input frequencies of certain test signals to be applied to the video signal lines during inspection be higher than or equal to input frequencies of test signals being applied to the scan signal lines.

In addition, advantages as to lower resistivities are obtainable by providing a region formed of a specific wiring layer with the lowest resistivity in the liquid crystal display device at any one of those wiring leads associated with the signal line side common lines or alternatively between the signal line side and test pads and leads associated with the scan line side common lines or between the scan line side common lines and test pads.

Furthermore, with the invention, the scan line side common lines are arranged by more than two lines. Use of a single line enables all-line simultaneous lighting. However, difficulties can occur in regard to the above-mentioned flicker lighting inspection. More specifically, for either one of the common inversion driving and dot inversion driving, drive is done in real in-use states in such a way that two neighboring pixels in an extension direction of video signal lines are reversed In polarity to each other. This is for the purpose of flicker suppression. Thus, in order to perform inspection as to flicker, it is required to drive in a way that two neighboring pixels in the video signal line extension direction are mutually reversed in polarity. As the use of a single scan line side common line must result in such two pixels being the same in polarity as each other, there is a problem that no flicker tests are achieved in real in-use states. In view of this, by employing two lines for permitting two neighboring pixels to be deviated or shifted in write timing, it becomes possible to drive in such a way that the two neighboring pixels in the video signal line extension direction to be mutually reversed in polarity, thus enabling the intended flicker test.

In addition, with regard to the flicker, the influence of a "jump-in" voltage upon writing into a TFT is also present. To let this be closer to a real-use state, it is desirable that more than three scan line side common lines be employed in specific liquid crystal display devices of the so-called Cadd scheme with a capacitor for storage of electrical charge as written into a pixel electrode being formed in particular between the pixel electrode and scan signal line at the rear stage. Since with this technique the front stage pixel's Cadd is formed on a scan signal line at the self stage and, further, the self stage pixel's Cadd is formed on a scan signal line at the rear stage, any intended writing into pixels in a way equivalent to real use events is realized by scanning a pixel at the self stage and its front and rear pixels in a specified order of sequence similar to that during real use states. Additionally, in certain schemes that do not constitute Cadd such as for example Cstg scheme or else, writing equivalent to real use events is possible even when the scan line side common lines consist of mere two lines; however, in regard to the influence of voltage potentials due to capacitive coupling between pixels, the use of more than three scan line side common lines in a similar manner exhibits an effect for approximation to real in-use states.

Note here that in the case of three lines, at six pixels ABCDEF aligned in a direction along the image signal line extension direction, the polarities of respective pixels relative to a reference signal potential become "+−++−+" by way of example, resulting in occurrence of a problem that pixels C and D, for example, are the same in polarity as each other. To avoid this problem, it will be desirable that the scan line side common lines consist of an even number of lines. In view of the problem in the Cadd scheme, it is deemed most effective to arrange them while employing four lines as a minimal number in the Cadd scheme or using two or four lines in the Cstg scheme.

The present invention should not be limited to the above stated arrangements or arrangements of embodiments to be set forth later in the description and ideas as disclosed therein. A variety of modifications and alterations will be possible without departing from the true spirit and scope of the invention.

Several preferred embodiments of the instant invention will now be explained in detail with reference to the accompanying drawings below. Although the following embodiments will be set forth in conjunction with liquid crystal display devices of the so-called TN type, the same goes with basic configurations of portions of devices of the IPS (lateral electric field) scheme to which the invention is applied except that counter electrode lead lines are drawn out on the thin-film transistor substrate side.

In addition, in the explanation presented below also, signal lines are also called drain lines whereas scan lines are called gate lines.

BRIEF DESCRIPTION OF THE DRAWINGS

FIG. 8 is a timing diagram showing display data as input from a signal source (main body) to a display control device and signals being output from the display control device to drain and gate drivers.

FIG. 11 is a layout explanation diagram of test terminals in one prior art liquid crystal display device.

FIG. 26 is a diagram showing pictorial views for explanation of test signals of one embodiment of the liquid crystal display device in accordance with the invention.

FIG. 27 is a diagram showing pictorial views for explanation of test signals of one embodiment of the liquid crystal display device in accordance with the invention.

FIG. 28 is a diagram showing pictorial views for explanation of test signals of one embodiment of the liquid crystal display device in accordance with the invention.

FIG. 29 is a diagram showing pictorial views for explanation of test signals of one embodiment of the liquid crystal display device in accordance with the invention.

FIG. 30 is a diagram showing pictorial views for explanation of test signals of one embodiment of the liquid crystal display device in accordance with the invention.

FIG. 31 is a diagram showing pictorial views for explanation of test signals of one embodiment of the liquid crystal display device in accordance with the invention.

DETAILED DESCRIPTION OF THE INVENTION

Figure 1:
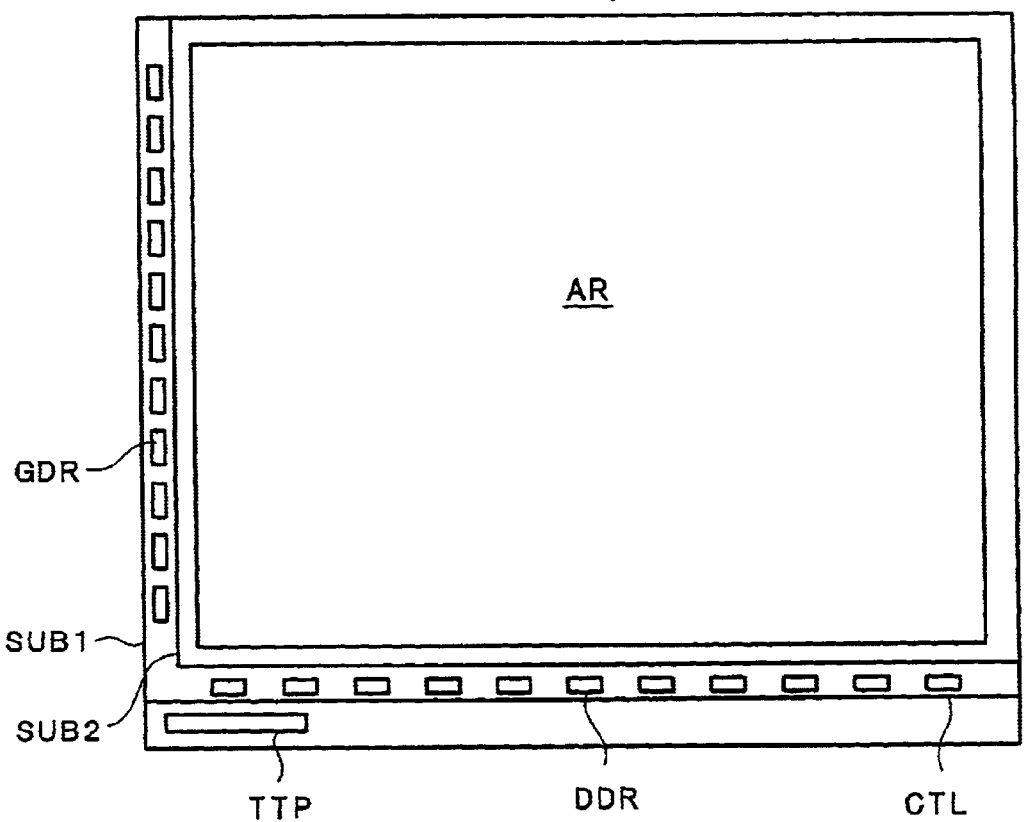
FIG. 1 is a diagram showing a plan view for explanation of one preferred embodiment of a liquid crystal display device in accordance with the present invention.

FIG. 1 is a diagram showing a plan view of a liquid crystal display device in accordance with one embodiment of the present invention. This liquid crystal display device includes a lamination of one substrate SUB1 and a remaining substrate SUB2 with a liquid crystal layer interposed between them. The one substrate SUB1 has its inside surface on which a matrix array of thin-film transistors, not shown, is formed. The other substrate SUB2 has its inside surface on which three primary color filters and more than one counter electrode are formed. A counter voltage will be applied to the counter electrode via wiring line or lines (not shown) formed on the inner surface of one substrate SUB1.

The one substrate SUB2 is greater in dimensions at its left side and lower side of FIG. 1 than the other substrate SUB2 to have oversized portions. Eleven scan drive ICs (gate drivers) GDR are mounted by FCA schemes at the left side peripheral portion whereas eleven signal drive ICs (drain drivers) DDR are at the lower side periphery (in FIG. 1, these are shown by their mount positions).

The one substrate SUB1 has a test pad formation region TTP. Part with this test pad formation region TTP disposed is a portion which will be cut and removed away along a cut line CTL after completion of the liquid crystal display device.

Figure 2:
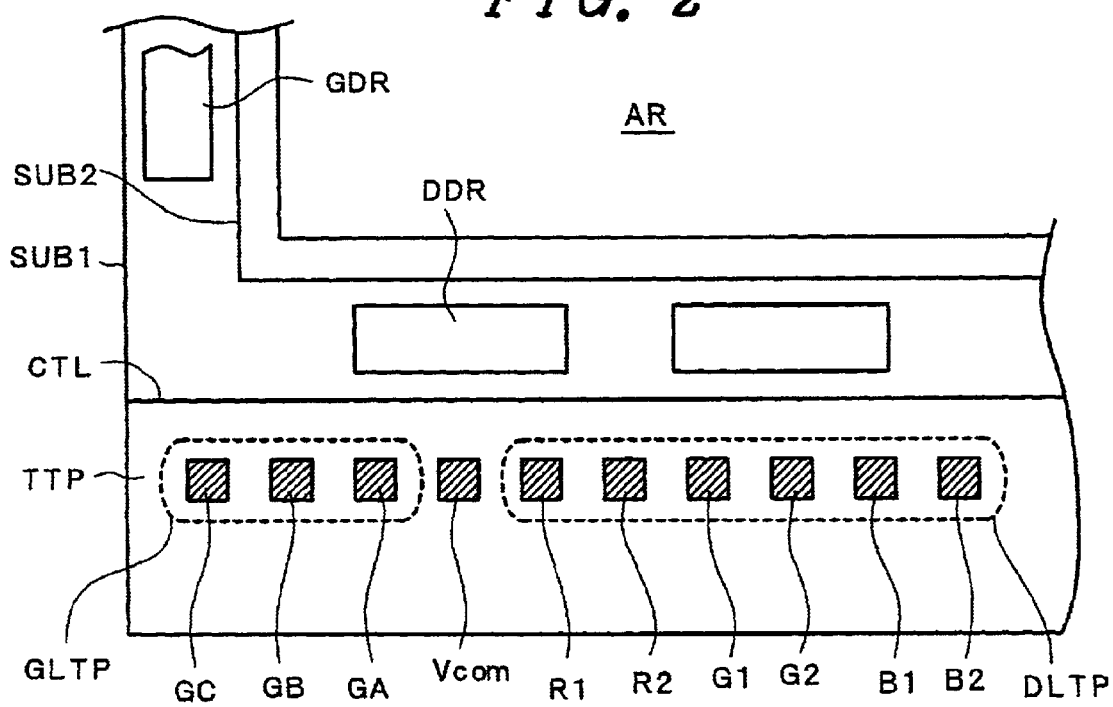
FIG. 2 is a partly enlarged diagram for detailed explanation of a test pad formation region TTP of FIG. 1.

FIG. 2 is an enlarged diagram for detailed explanation of the test pad formation region TTP of FIG. 1. The test pad formation region TTP is formed in a cut removal region of one substrate SUB1, which will be cut away along cut line CTL of the final product. This test pad formation region TTP is such that gate driver side test pads GLTP and drain driver side test pads DLTP plus test pads Vcom of counter electrode lead lines are linearly laid out with equal intervals.

The gate driver side test pads GLTP are classified into three or four groups whereas the drain driver side test pads DLTP are into six groups, wherein ten to eleven test pads in total are used f or constitution along with the counter electrode lead line test pad Vcom.

Accordingly, with this illustrative embodiment, it is possible to perform all the tests at a time by use of an array of ten to eleven probes that are equally spaced.

Alternatively, it is also possible to dispose the gate driver side test pads GLTP and drain driver side test pads DLTP in such a way that these are separated from each other, which in turn makes it possible to design so that these test pads and its associated counter electrode lead line test pad Vcom being provided at an appropriate position are used to perform a gate driver side test and drain driver side test independently of each other.

In this way, the above noted embodiment is capable of increasing the width and length plus layout pitch of the test pads to be connected to signal line leads; thus it becomes possible to enhance contact accuracy while at the same time f acilitating production of the probes used. In addition, it is possible by standardization of such probes to manufacture test apparatus or equipment capable of offering enhanced applicability to a wide variety of types of products.

Figure 3:
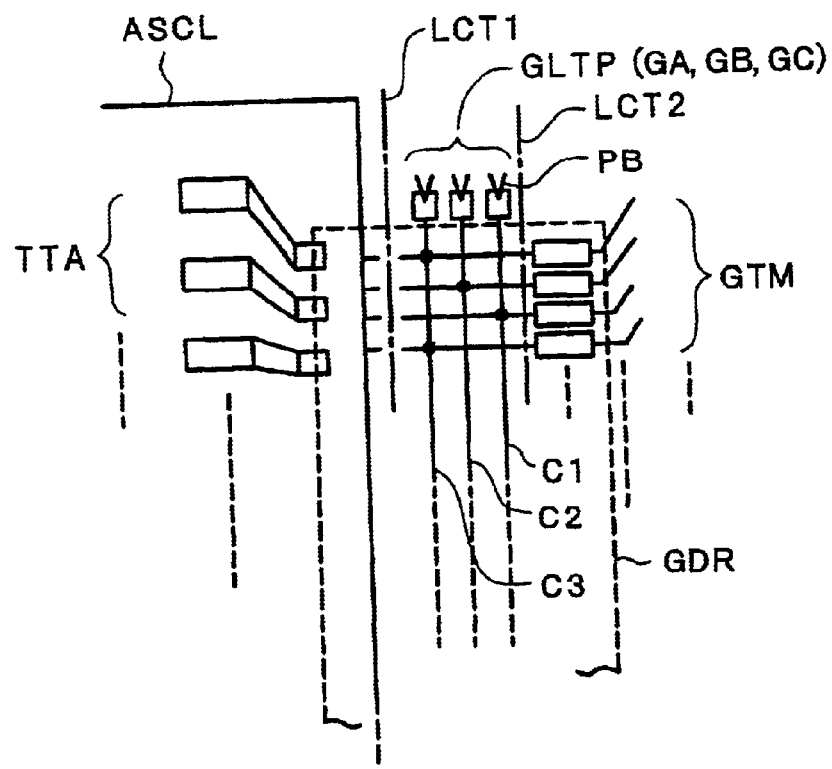
FIG. 3 is a diagram showing a pictorial representation of wiring leads at main part of one embodiment of the liquid crystal display device in accordance with this invention.
Figure 3:
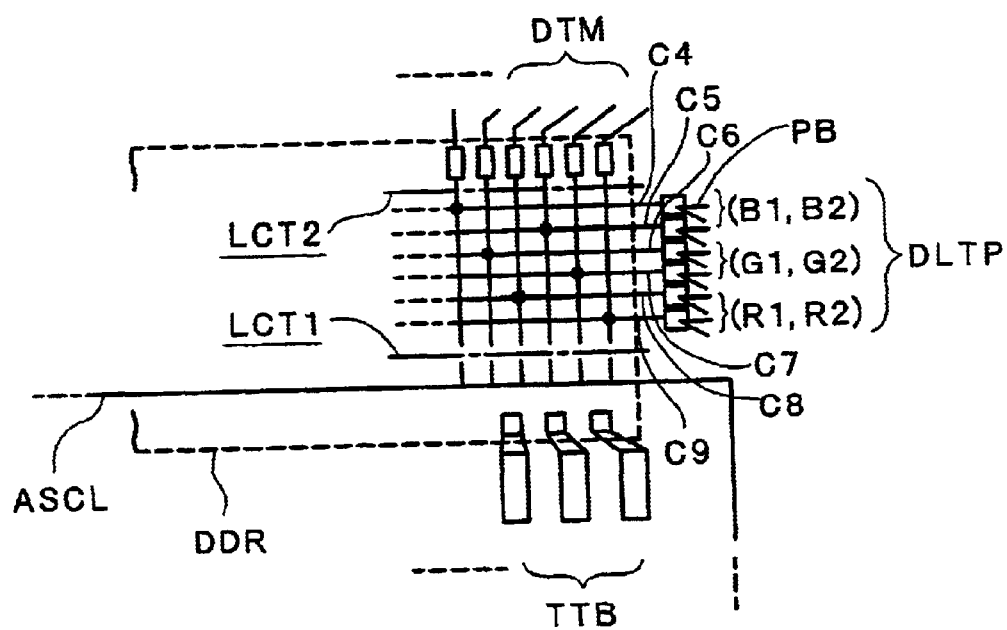

FIG. 3 shows pictorial representations for explanation of wiring patterns at main parts of the liquid crystal display device in accordance with one embodiment of the instant invention, wherein part (a) shows gate line side wiring leads whereas part (b) shows drain side wiring leads. In FIG. 3, reference character "GDR" designates gate driver mount positions; GTM denotes gate driver output terminals (gate line lead terminals); TTA indicates gate driver Input terminals; ASCL is a static electricity suppression common line; C1, C2, C3 are three scan line side common lines for common connection of three groups of gate line leads of multiple gate drivers corresponding to the front stage, next stage and rear stage thereof or, alternatively, four groups in order to change polarities in units of dots; GLTP (GA, GB, GC), test pads formed at respective scan line side common lines C1, C2, C3; PB. probe; LCT1 and LCT2, laser cut lines. The test pads GLTP (GA, GB, GC) formed at respective scan line side common lines C1, C2, C3 are disposed at specified locations shown in FIG. 2.

In this wiring structure, at (a) of the gate driver side, after completion of manufacturing of the one substrate SUB1, let the scan line side common lines C1, C2, C3 be cut away along the laser cut line LCT1 for separation from the static electricity suppression common line ASCL. Cutting the scan line side common lines C1, C2, C3 away from the static electricity suppression common line ASCL results in respective scan line side common lines C1, C2, C3 becoming test wiring leads of three or four independent systems.

In this state, let probes PB be attached to the test pads GLTP (GA, GB, GC) formed at respective scan line side common lines C1, C2, C3 to thereby execute the intended connection failure test and turn-on or "lighting" test.

After having finished the test procedure, let respective scan line side common lines C1, C2, C3 be separated from the gate driver output terminals GTM at the laser cut line LCT2; then, FCA-mount gate drivers between the output terminals GTM and the gate driver input terminals TTA.

Similarly. at (b) of the drain driver side, after having manufactured the one substrate SUB1, let the signal line side common lines C4, C5, C6. C7, C8, C9 be cut away along the laser cut line LCT1 for separation from the static electricity suppression common line ASCL. Cutting the signal line side common lines C4, C5, C6, C7, C8, C9 away from the static electricity suppression common line ASCL results in respective signal line side common lines C4, CS, C6, C7, C8, C9 becoming test wiring leads of six independent systems.

In this state, let probes PB be In contact with the test pads DLTP (B1, B2, G1, G2, R1, R2) formed at respective signal line side common lines C4. C5, C6, C7, C8, C9 to thereby execute the intended connection failure test and lighting test.

After having completed the tests, let respective signal line side common lines C4, C5, C6, C7, C8, C9 be separated from the drain driver output terminals DTM at the laser cut line LCT2; then, FCA-mount drain drivers between the output terminals DTM and the drain driver input terminals TTB.

Additionally, in the lighting test, attach a probe to the counter electrode lead line test pad Vcom for application of a specified voltage to thereby create an electric field for controlling the orientation of liquid crystals between it and a pixel electrode as connected to the output electrode of a thin-film transistor, thus checking for the presence or absence of turn-on or "lighting" of a pixel(s).

Optionally, the laser cut lines LCT1, LCT2 are replaceable with etching cut lines for use in separation through etching processes. Other known similar suitable cutting methods are also employable.

Figure 4:
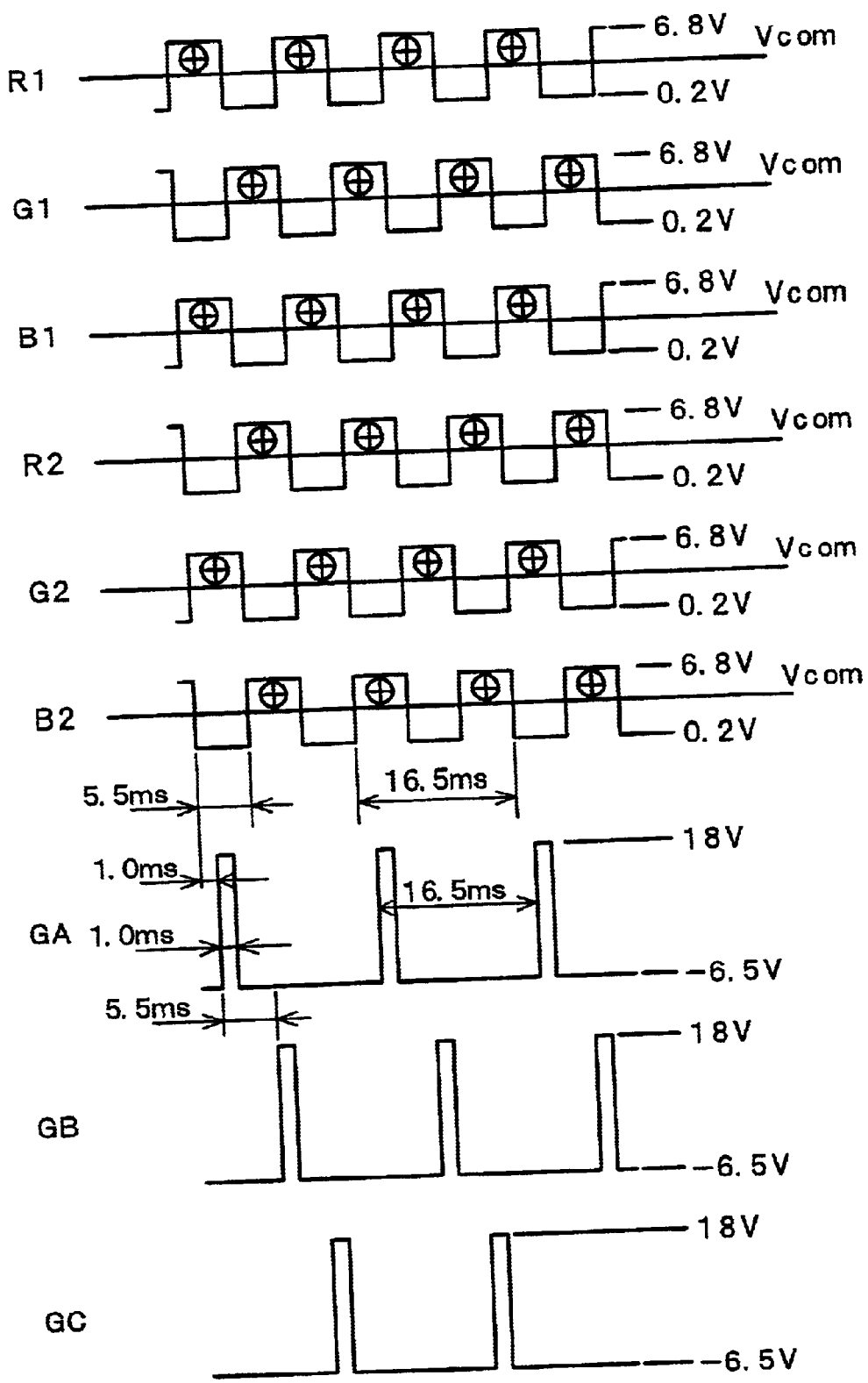
FIG. 4 is a waveform diagram for explanation of exemplary test signals as applied to drain test pads and gate test pads during turn-on test of one embodiment of the liquid crystal display device in accordance with the invention.

FIG. 4 is a waveform diagram for explanation of exemplary test signals to be applied to the drain test pads DLTP (B1, B2, G1, G2, R1, R2) and test pads GLTP (GA, GB, GC) during lighting test procedure of one embodiment of the liquid crystal display device of this invention. Note here that these test signals are of the so-called dot inversion scheme, wherein the illustrative voltage value pulse widths and pulse intervals and others are mere examples.

Applying the test signals shown in FIG. 4 to respective test pads makes it possible to execute lighting test through turn-on of a certain display pattern on a per-system basis.

With this embodiment, it is possible to provide the intended liquid crystal display device having its unique wiring lead structure capable of performing a variety of tests by simultaneous contact of probes with all the terminals in an all-at-a-time manner, while making it possible by standardization of the pattern of test terminals to employ test equipment having probes for common use with a wide variety of types of products.

Figure 5:
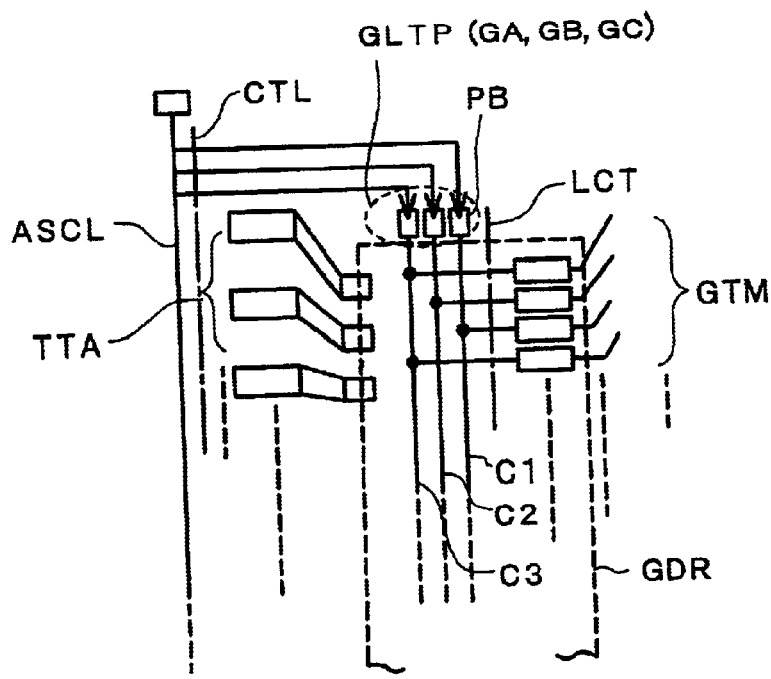
FIG. 5 is diagram showing a pictorial representation for explanation of major wiring leads at main part of another embodiment of the liquid crystal display device in accordance with the invention.
Figure 5:
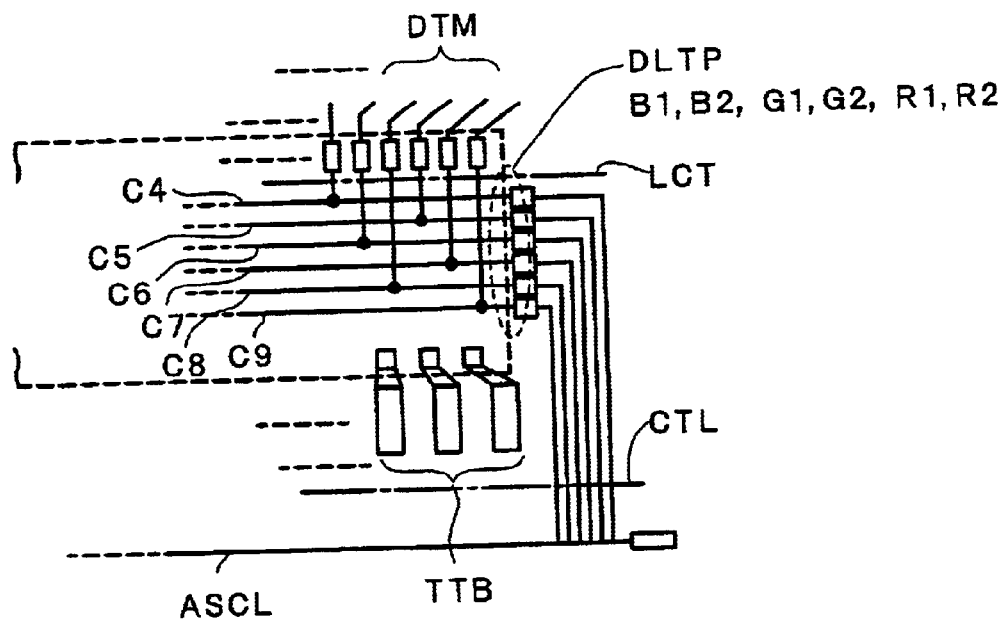

FIG. 5 shows pictorial representations for explanation of wiring patterns at main parts of another embodiment of the liquid crystal display device in accordance with the invention, a wherein part (a) shows gate line side wiring leads whereas part (b) shows drain side wiring leads. In FIG.

5 the same reference characters are used to designate corresponding parts with the same functions.

In the embodiment shown herein, the scan line side common lines Cl, C2, C3 are connected to the static electricity suppression common line ASCL at a location outside the cut lines CTL, rather than to the gate driver input terminals TTA.

Similarly the signal line side common lines C4, C5, C6, C7, C8, C9 are connected to the static electricity suppression common line ASCL at a location outside the cut lines CTL, rather than to the drain driver input terminals TTB.

With such an arrangement, it becomes possible when cutting away the static electricity suppression common line ASCL after production of the substrate SUB1 to make respective groups or "systems" of the scan line side common lines C1, C2, C3 and the signal line side common lines C4, C5, C6, C7, C8, C9 independent of one another. This in turn makes it possible to reduce by one the requisite number of laser cut (or etching cut) processes.

With this embodiment also, it is possible to provide the intended liquid crystal display device having its unique wiring lead structure capable of performing a variety of tests by simultaneous contact of probes with all the terminals in an all-at-a-time manner, while making it possible by standardization of the pattern of test terminals to employ test equipment having probes for common use with a wide variety of types of products.

As another embodiment of the invention, let the signal line side common lines C4, C5, C6, C7, C8, C9 at part (b) of FIG. 3 be "disassembled" between respective blocks; then, provide a test pad(s) between respective blocks. Whereby, it is possible to increase the number of kinds of display patterns for use during inspection.

It should be noted that although in the respective embodiments stated supra the gate side is designed into three or four groups or "systems" for provision of the common lines C1, C2, C3, this may be modified as still another embodiment of the invention in a way such that the gate line side is tested through simultaneous attachment of the probes to all the terminals concerned as in the prior art in view of the fact that the gate side terminals are designed to have relatively large terminal widths and pitches when compared to the drain side terminals. One preferred configuration of it is as shown in part (a) of FIG. 11.

In addition, as yet another embodiment of the invention, transistors or diodes are disposed between the scan line side common lines C1, C2, C3 and the signal line side common lines if C4, C5, C6, C7, C8, C9 shown in FIG. 3 or 5 on one hand and the gate driver output terminals (gate line lead terminals) GTM and drain driver output terminals (drain line lead terminals) DTM on the other hand for separation between respective lines with respect to test signals.

With any one of the above-noted embodiments also, it is possible to provide the intended liquid crystal display device having its unique wiring lead structure capable of performing a variety of tests by simultaneous contact of probes with all the terminals in an all-at-a-time manner, while making it possible by standardization of the pattern of test terminals to employ test equipment having probes for common use with a wide variety of types of products.

Although only liquid crystal display devices of the type with the gate drivers and drain drivers mounted by the so-called FCA mount techniques are explained in the above embodiments, the test circuitry of this invention may also be applied to liquid crystal display devices of the type with such drivers mounted using prior known TCP techniques.

An explanation will next be given of an example of the entire arrangement of a liquid crystal display device embodying the invention, along with examples of its operatively associated drive system and application equipment.

Figure 6:
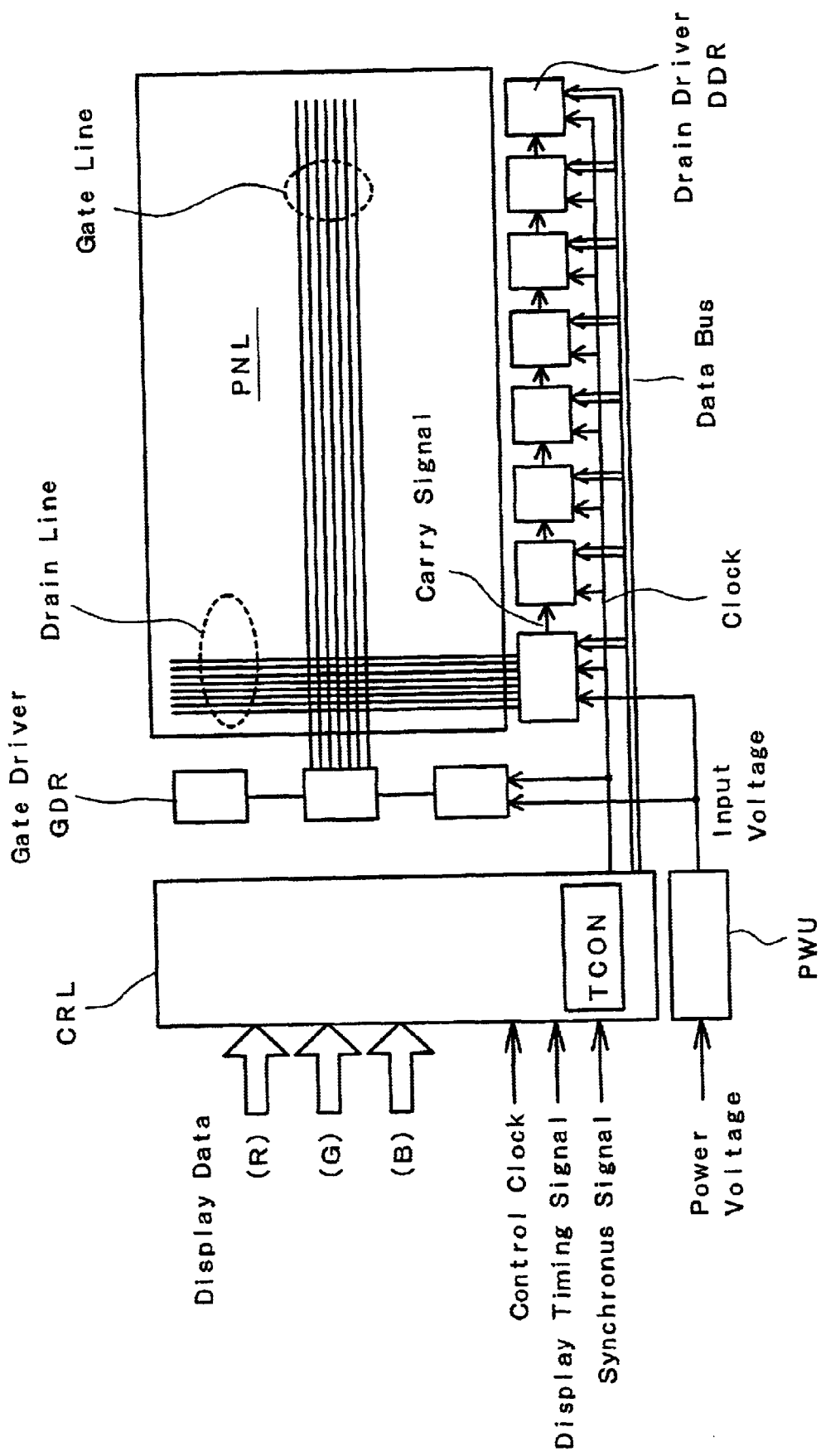
FIG. 6 is a block diagram for explanation of an arrangement of a drive system of a standard active-matrix liquid crystal display device to which the invention is applied.

FIG. 6 is a block diagram for explanation of a drive system configuration of an ordinary or standard active-matrix liquid crystal display device to which the invention is applied. This liquid crystal display device comprises a liquid crystal panel PNL including two substrate with a liquid crystal layer laid therebetween, data line (drain signal line or drain line) drive circuits (IC chips) corresponding to the aforesaid drain drivers DDR at the periphery of this liquid crystal panel, scan line (gate signal line or gate line) drive circuits (IC chips) corresponding to said gate drivers GDR, a display control device CRL for use as display control means for supplying these drain drivers DDR and gate drivers GDR with display data and/or clock signals along with gray-scale gradation voltages and the like for image display operations, and a power supply circuit PWU.

Signals coming from an external signal source such as a computer, personal computer, television receiver circuitry or else, which include display data (said display signals), control signal clocks, display timing signals and synchronization signals, are input to the display control device CRL. The display control device CRL is provided with a gradation reference voltage generating unit, timing converter TCON and others, and is operable to convert externally incoming display data into certain data of the format adaptable for displaying on the liquid crystal panel PNL.

Display data and clock signals for the gate drivers GDR and drain drivers DDR are supplied in a way shown in FIG. 6. A carry output at the front stage of drain driver DDR is directly given with no changes to a drain driver carry input at the next stage.

Figure 7:
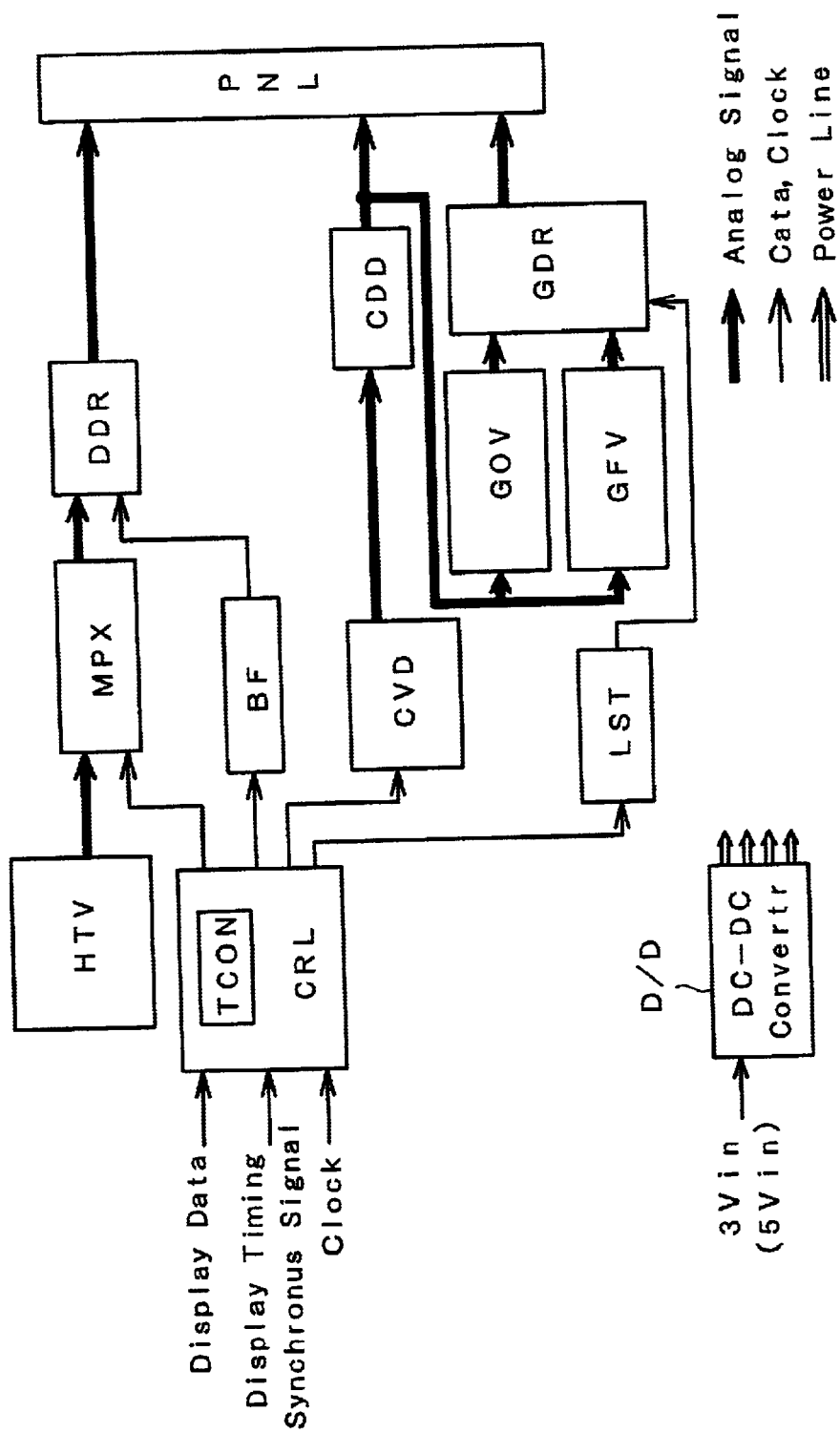
FIG. 7 is a block diagram schematically showing an arrangement of each driver of a liquid crystal panel along with a flow of signals therein.

FIG. 7 is a block diagram showing a schematical arrangement of respective drivers of the liquid crystal panel and also signal flows therein. A drain driver DDR is constituted from a data latch unit for latching display data (display signal) such as a video (image) signal or else, and an output voltage generation circuit. In addition, a gray-scale or gradation reference voltage generator HTV, multiplexor MPX, common voltage generator CVD, common driver CDD, level shift circuit LST, gate-on voltage generator GOV, gate-off voltage generator GFD and DC-DC converter D/D are provided on a circuit board with the display control device CRL and power supply circuit PWU of FIG. 7 mounted thereon.

FIG. 8 is a timing diagram showing display data as input from a signal source (main body) to the display control device and signals as output from the display control device to the drain and gate drivers. The display control device CRL receives from the signal source control signals (clock signal, display timing signal and synch signal) for generating a clock D1 (CL1), shift clock D2 (CL2) and display data as control signals being sent to drain drivers DDR and, simultaneously, generating a frame start instruction signal FLM, clock G (CL3) and display data as control signals passed to gate drivers GDR.

Note here that in a scheme using low-voltage differential signal (LVDS signal) for transmission of display data from the signal source, the LVDS signal from the signal source is supplied to gate drivers GDR and drain drivers DDR after completion of conversion to an original signal at an LVDS receiver circuit as mounted on a circuit board (interface substrate) which mounts thereon the above stated display control device.

As apparent from viewing FIG. 8, the drain driver's shift clock signal D2 (CL2) is the same in frequency as the clock signal (DCLK) and display data as input from a main-frame computer: in XGA display elements, the frequency is as high as about 40 megahertz (MHz). The liquid crystal display device thus arranged features in reduced thickness and low power consumption, and tends to be widely employed as display devices in respective fields in near future.

Figure 9:
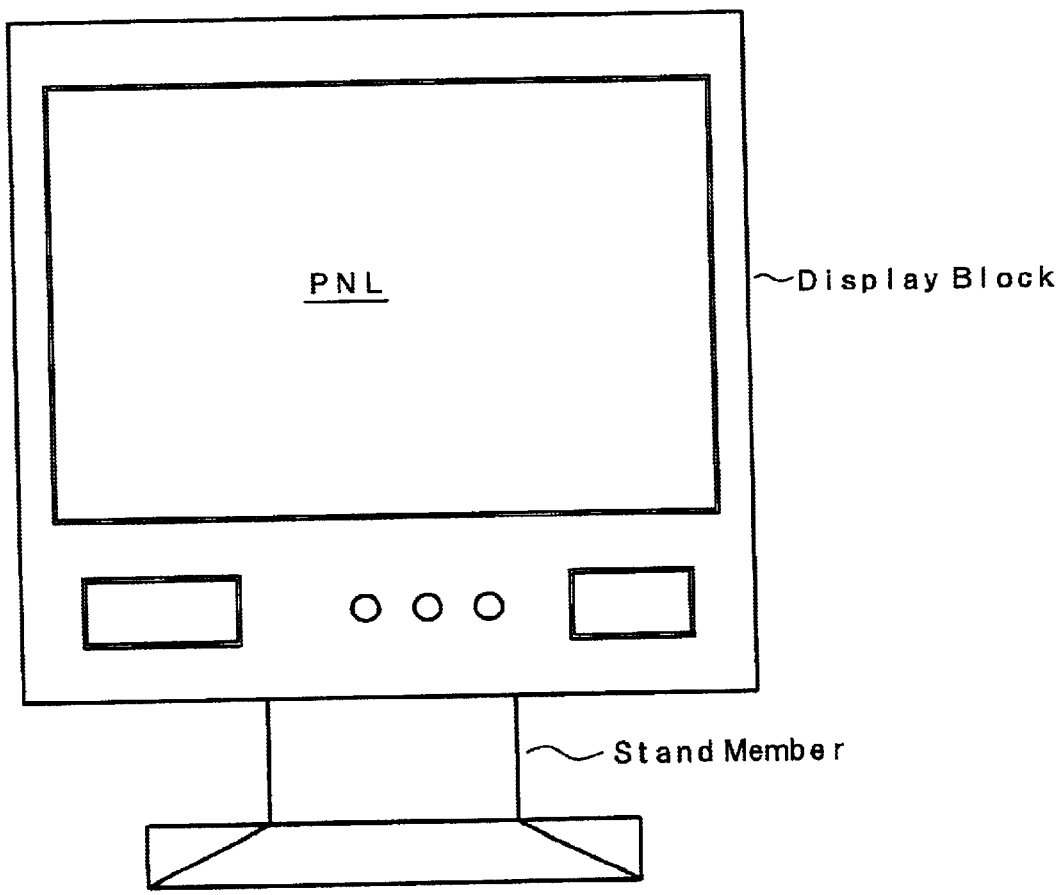
FIG. 9 is a diagram showing an exterior appearance of one exemplary display monitor for use as electronic equipment with the liquid crystal display device of the invention mounted therein.
Figure 10:
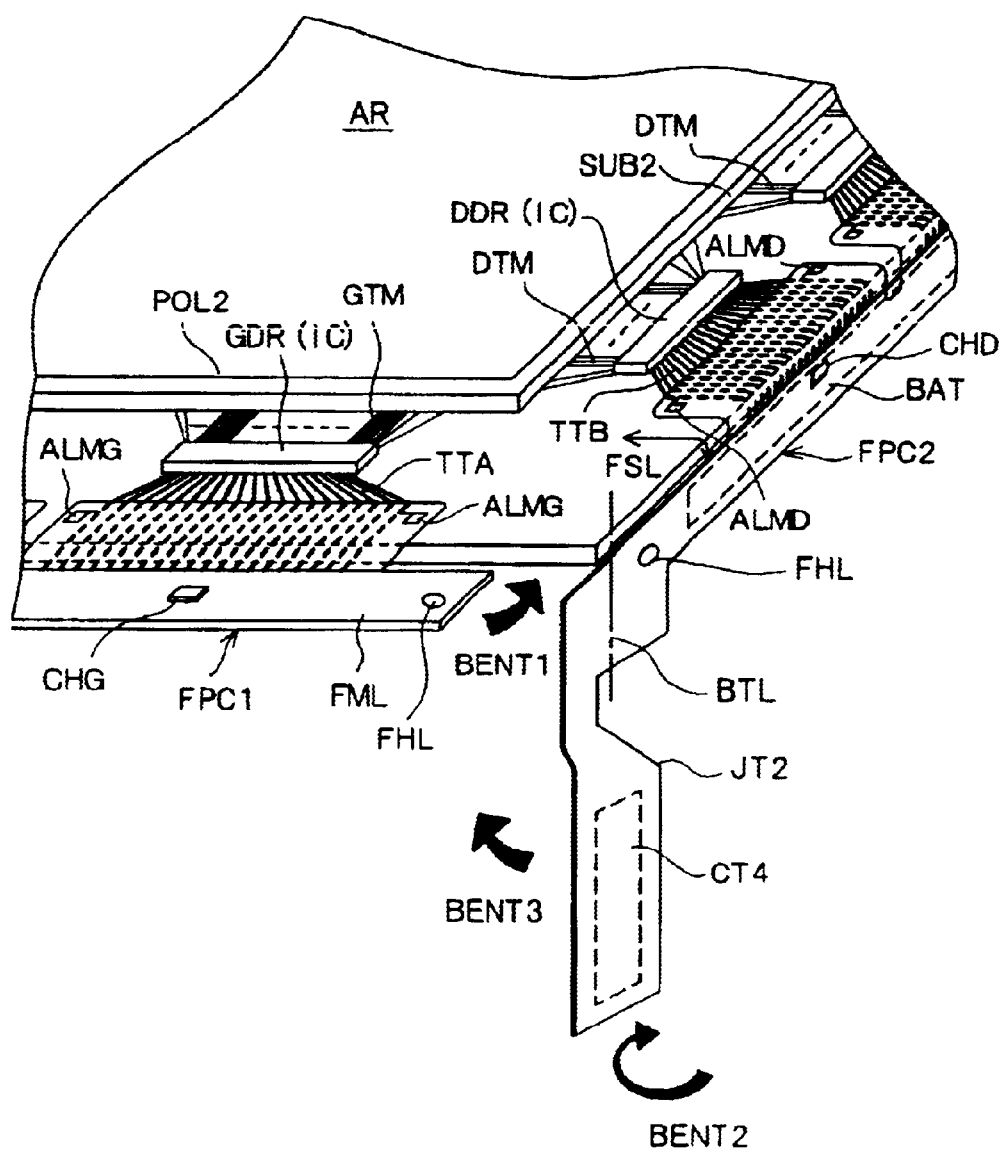
FIG. 10 is a diagram showing a perspective view of main part of a liquid crystal display device of the type which employs FCA mount scheme.

FIG. 9 is an exterior appearance diagram showing one example of a display monitor adaptable for use as electronic equipment with the liquid crystal display device of the present invention mounted therein. The liquid crystal display device is mounted at a screen of this monitor, that is, display section thereof. The liquid crystal display device constituting this display monitor is the one that has passed the open-circuit test and lighting test by use of the test circuitry as explained in said embodiments and thus is high in reliability; thus it is possible to obtain high-quality on-screen images for an increased length of time period.

It must be noted that the liquid crystal display device incorporating the principles of the invention should not be limited to the above-noted display monitor and may alternatively be used as monitors of desktop personal computers and notebook personal computers, television receivers, and display devices of any other equipment.

An explanation will next be given of an exemplary main-part configuration of the present invention in more detail below.

Firstly, scan line side common lines will be explained.

Figure 12:
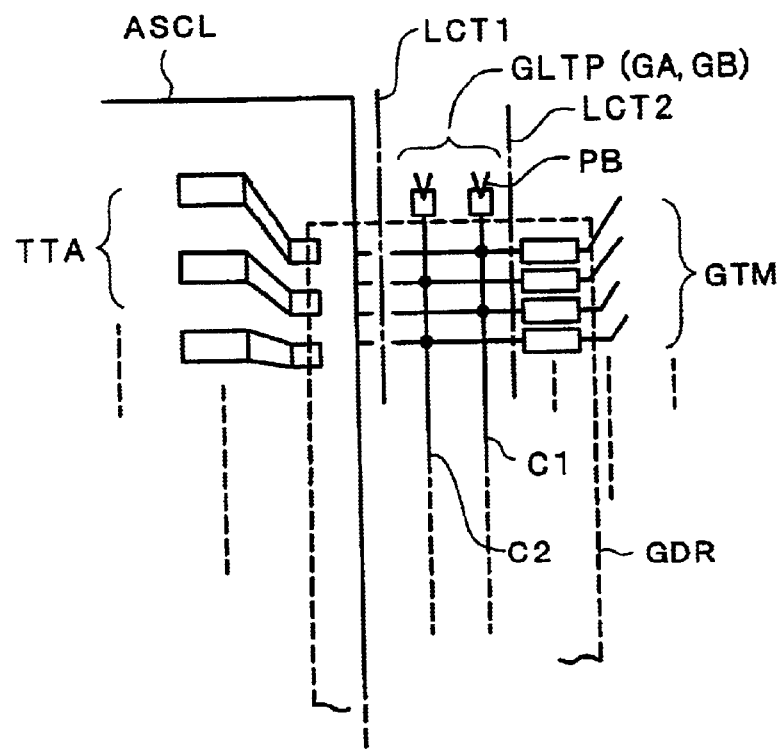
FIG. 12 is a pictorial representation diagram for explanation of a lead wiring pattern at main part of one embodiment of the liquid crystal display device in accordance with the invention.
Figure 12:
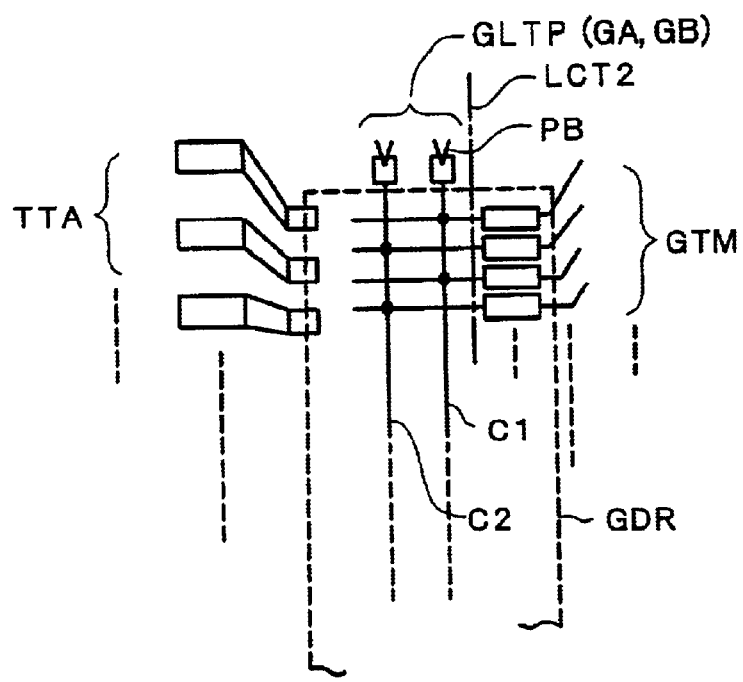

FIG. 12($a$) shows an example with two lines C1, C2 being formed as the scan line side common lines.

All-line simultaneous turn-on or "lighting" is possible even when connecting neighboring scan signal lines to the same scan line side common line. However, difficulties occur in relation to flicker lighting tests. In view of this, at least two scan line side common lines are provided as shown in FIG. 12($a$).

Additionally the above effect remains similar upon application to an arrangement with the scan signal lines and static electricity suppression common line ASCL being electrically disconnected from each other as shown in FIG. 12($a$). Further, since the scan signal lines are connected to either one of the scan line side common lines C1, C2 in units of a plurality of ones, it is possible to suppress or lighten the influence of static electricity applied thereto, as compared to the case in which the scan signal line exists alone. In this case, an ASCL cutting process will no longer be required, thus enabling reduction in number of process steps resulting in a likewise decrease in production costs.

The storage capacitor of a pixel may be formed of either one of Cadd and Cstg.

Figure 13:
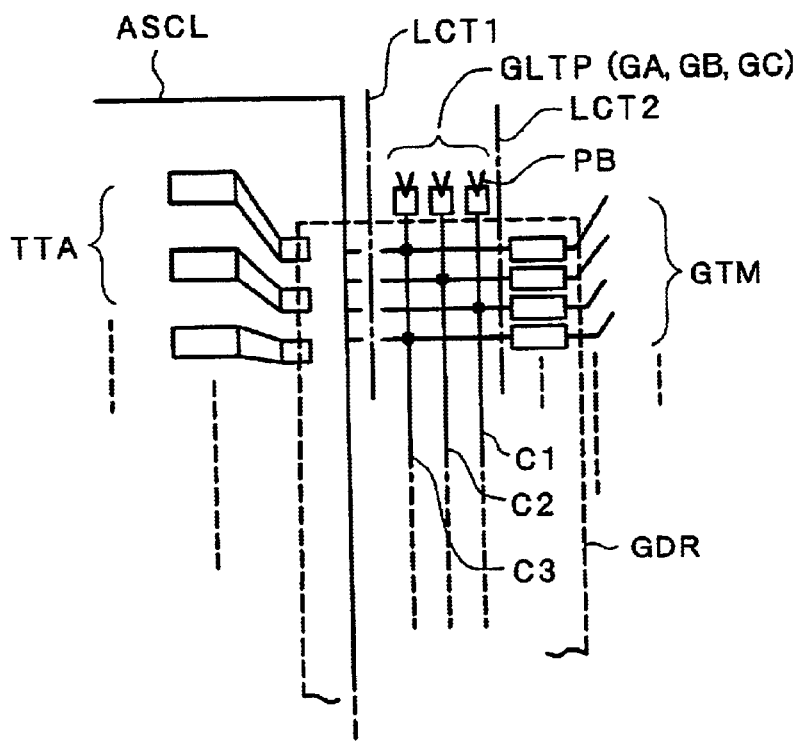
FIG. 13 is a pictorial representation diagram for explanation of a lead wiring pattern at main part of one embodiment of the liquid crystal display device in accordance with the invention.
Figure 13:
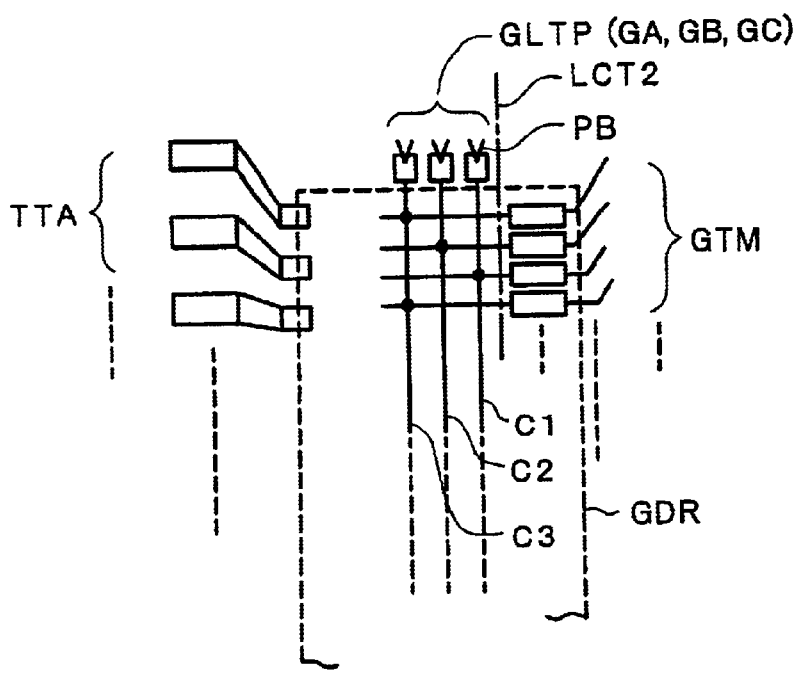

FIG. 13($a$) shows an example with three lines C1, C2, C3 formed for use as the scan line side common lines, and FIG. 13($b$) is an example that does not have its ASCL.

As stated as the means, in regard to the flicker, the influence of a "jump-in" voltage upon writing into a TFT is also present. To let this be closer to a real-use state, it is desirable that more than three scan line side common lines be employed in specific liquid crystal display devices of the so-called Cadd scheme with a capacitor for storage of electrical charge as written into a pixel electrode being formed in particular between the pixel electrode and scan signal line at the rear stage. In view of this, the illustrative embodiment is designed so that the front stage pixel's Cadd is formed on a scan signal line at the self stage and, further, the self stage pixel's Cadd is formed on a scan signal line at the rear stage. Obviously, Cstg may also be used. Note however that with this arrangement, since at six pixels ABCDEF aligned in a direction along the image signal line extension direction the polarities of respective pixels relative to a reference signal potential become "+−++−+" by way of example as has been stated as the means, resulting in occurrence of a problem that pixels C and D, for example, are the same in polarity as each other, it is desirable that four lines as will be shown later are employed or alternatively two lines as has been shown previously be employed— especially for liquid crystal display devices of the type having a pixel structure with the Cadd-scheme capacitance section, the use of four lines as will be set forth below is more desirable.

Figure 14:
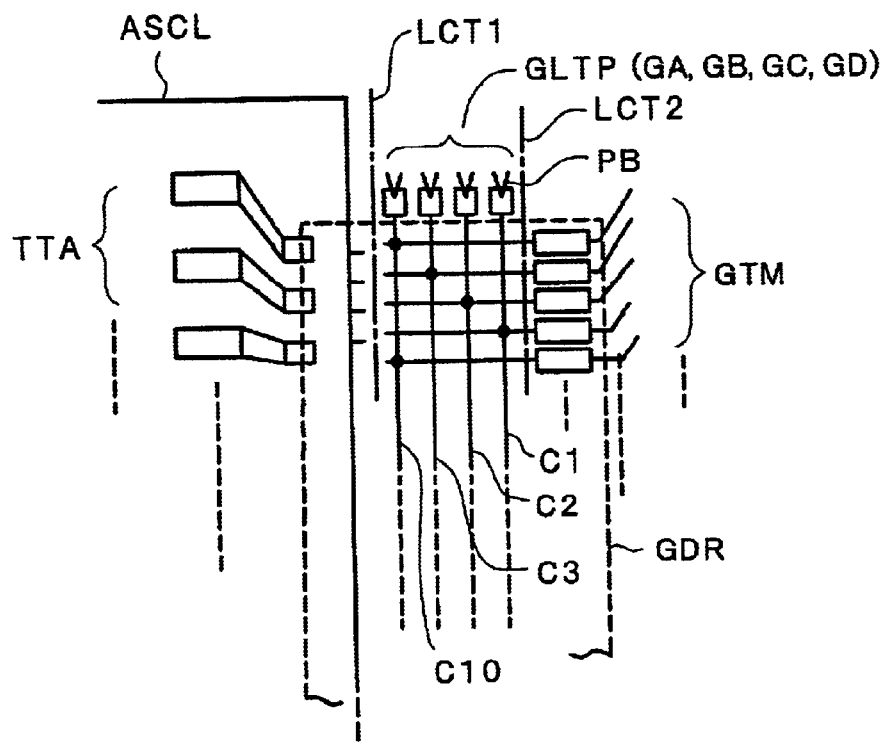
FIG. 14 is a pictorial representation diagram for explanation of a lead wiring pattern at main part of one embodiment of the liquid crystal display device in accordance with the invention.
Figure 14:
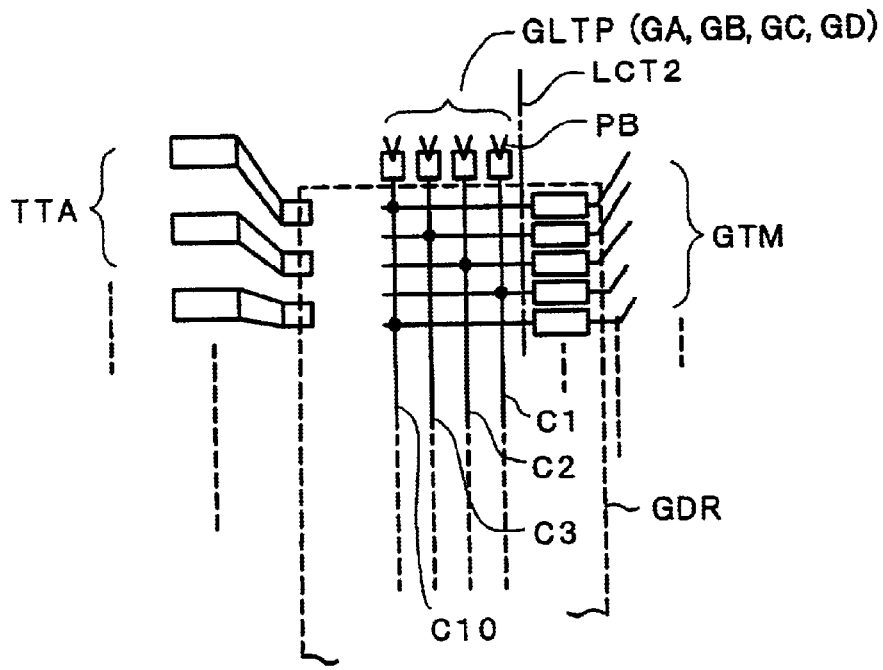

FIG. 14($a$) shows an example with four lines C1, C2, C3, C10 formed as the scan line side common lines whereas FIG. 14($b$) is an example that does not have its ASCL.

Whereby it is possible for pixels in the video signal extension direction to be opposite in polarity to each other in the way stated previously. This makes it possible to achieve tests more closer to real use states, thus improving inspection accuracies.

An explanation will next be given of the signal line side common lines.

Figure 15:
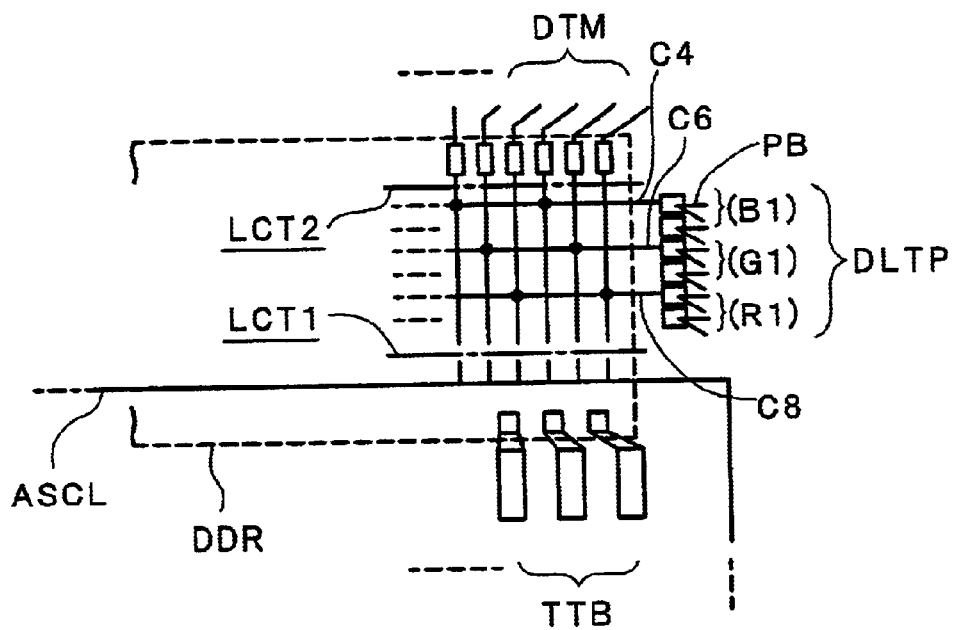
FIG. 15 is a pictorial representation diagram for explanation of a lead wiring pattern at main part of one embodiment of the liquid crystal display device in accordance with the invention.
Figure 15:
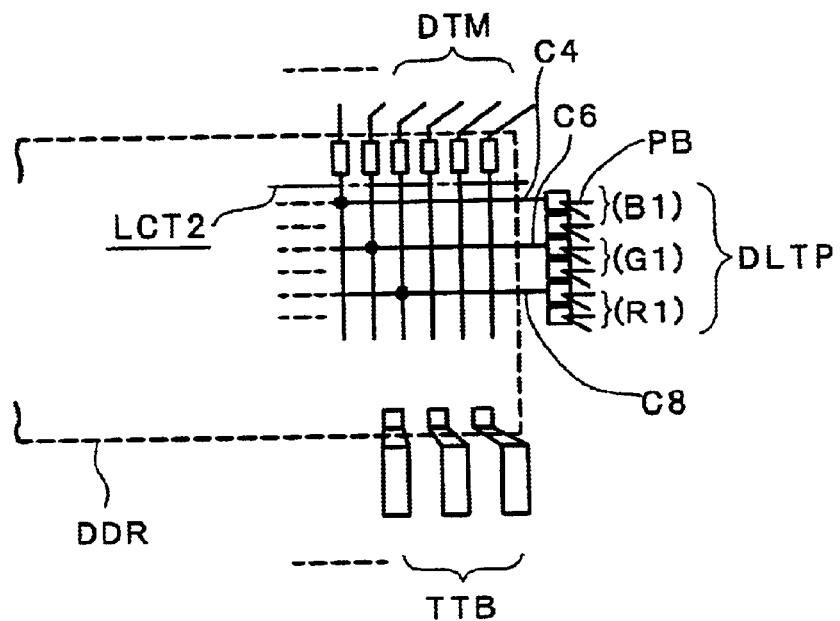

FIG. 15($a$) shows an example with three lines C4, C6, C8 formed as the signal line side common lines.

One significant feature of the present invention is that the signal line side common lines are separated in units of colors of color filters for reduction of the requisite number of test pads to thereby reduce probe costs and also enable execution of inspection of high-precision products while at the same time realizing tests through displaying of colors. And if such color filters are of the three primary colors of red, green and blue, any intended tests as to almost every color displayable by products become possible by using as test patterns white displaying with simultaneous lighting of respective colors and individual lighting in units of respective colors for discrete tests of red, green and blue, with or without control of gray-scale gradation levels of respective colors. Obviously the colors should not be limited only to red, green and blue. Similar results are also obtainable with liquid crystal display devices using color filters of the so called complementary color type with cyan, magenta and yellow. The same goes with all the embodiments set forth in the description. With the present invention, color purity tests of respective colors become possible. Further, display irregularity inspection accuracy was significantly improved for liquid crystal display devices which are inherently subjected to all-color simultaneous lighting tests only. The color filters required are formed through processes of individual deposition and exposure plus development in units of colors or, alternatively, impregnation of individual colors. Accordingly, in-plane uniformities of color densities or distribution on a film thickness plane occurs in units of respective colors. In the case of simultaneous lighting of respective colors, influences of these ordinarily become difficult to be seen. For example, in case where the film thickness of red alone locally changes, influence of such red film thickness local change upon brightness or illuminance in the event of simultaneous lighting of the three colors of red, green and blue becomes about ⅓ of that in the event of unicolor displaying of red. Thus, only the use of all-color simultaneous lighting results in a decrease in inspection sensitivity regarding illuminance irregularities—in particular color irregularities. This is the reason.

FIG. 15(b) is an example that does not have its ASCL. With this arrangement also, certain static electricity suppression effects are realizable while reducing the requisite number of manufacturing processes in a similar way to that of the scan side common lines of FIG. 12(b).

FIG. 16(a) shows an example with six lines C4, C5, C6, C7, C8, C9 formed as the signal line side common lines. This arrangement is characterized in that the signal line side common lines are separated as those for positive and negative polarities in units of at least colors of the color filters. More specifically, six signal line side common lines are provided with respect to color filters of the three primary colors of red, green and blue. Known liquid crystal display device driving methods typically include a common inversion drive method and a dot inversion drive method. The common inversion drive is such that at least three signal line side common lines are employed as discussed above due to the fact that in most cases the pixels neighboring in a scan signal line extension direction are the same as each other in polarity relative to the reference signal potential. On the contrary, the dot inversion drive method is such that neighboring pixels in the scan signal extension direction are ordinarily driven in such a way that these are of opposite polarities relative to the reference signal potential. Due to this, in the case of using three signal line side common lines in dot inversion events, six certain pixels neighboring in the scan line extension direction become "+−++−+" by way of example—in this case, any intended polarity inversion is no longer realizable between B and R. This makes it difficult during turn-on or "lighting" tests to accurately inspect flicker, that is, brightness irregularity. To avoid this, six signal side common lines are employed for use as positive and negative polarities in units of color filter colors thus making it possible for six pixels of RGBRGB to have an alternate opposite polarity pattern of "+−+−+−", thereby enabling improvement of flicker inspection accuracies.

Figure 16:
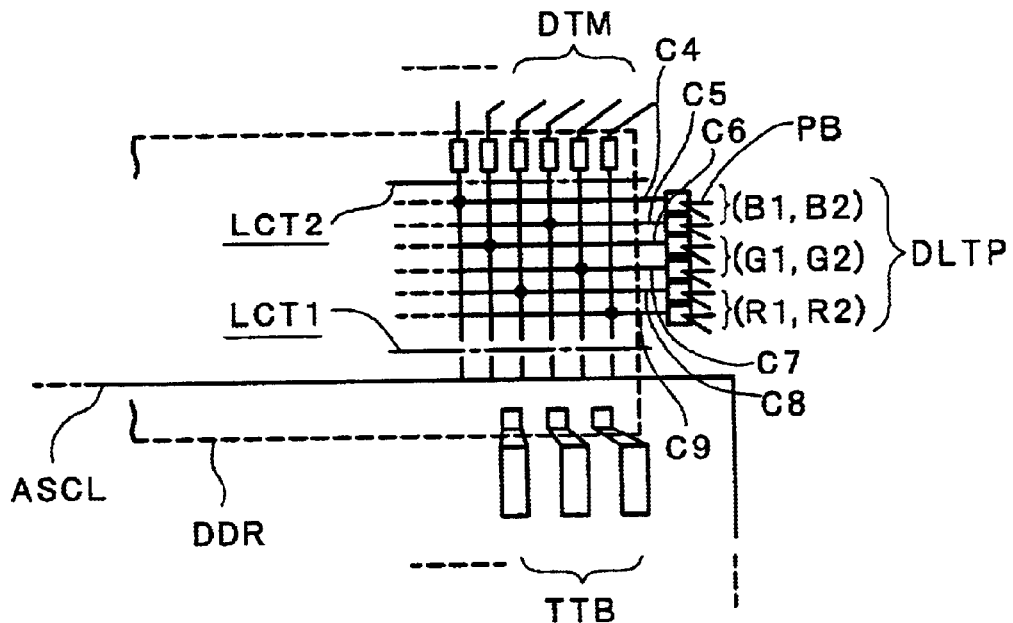
FIG. 16 is a pictorial representation diagram for explanation of a lead wiring pattern at main part of one embodiment of the liquid crystal display device in accordance with the invention.
Figure 16:
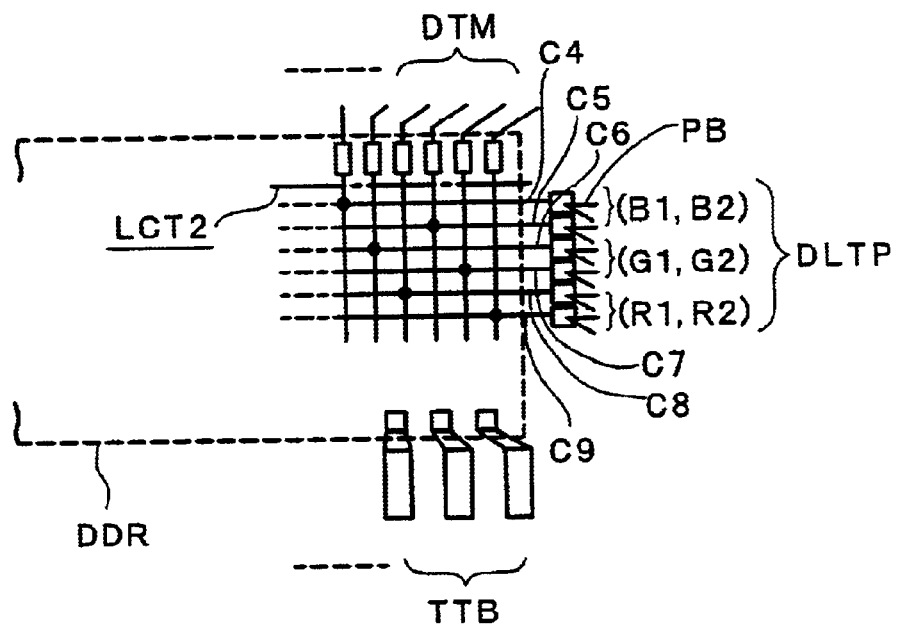

The scan line side common line arrangements shown in FIGS. 12, 13 and 14 and the signal line side common line configurations of FIGS. 15 and 16 are combinable together whereby both effects are obtainable at a time. m An explanation will next be given of cutting of LCT1, CLT2 shown in a respective one of FIGS. 12 through 16.

FIG. 17(a) shows one example in the case of TCP scheme. ASCL is formed inside of a substrate edge portion, and is electrically connected to scan signal lines. At a pre-test stage, separate ASCL from respective scan signal lines in a region LCT1. This is for inspection of respective colors. Without this cutoff process, these lines remain connected to ASCL resulting in connection of respective scan signal lines via scan line side signal lines so that any intended unicolor inspection is impossible. Separation may be done by any one of laser beam cutting techniques, etching techniques, and techniques for cutting a substrate in the region. Laser cut techniques offer the highest positioning accuracy so that it is possible to reduce the distance between the scan side signal lines and ASCL, which advantageously makes it possible to effectively utilize the area of a mother glass plate, resulting in an increase in size of products as taken from the same mother plate. The use of etching techniques enables all-at-a-time processing with an increased number of substrates being put into etching liquid. In this case, a structure is required for letting a to-be-separated layer be exposed in advance in a to-be-separated region, and it is desirable that a conductive layer at such part be a single layer. One exemplary arrangement is that a terminal section is formed of a single layer of transparent conductive material such as ITO or is covered with it while forming an etching portion using metals and also employing different etching liquids therebetween. With such an arrangement, it is possible to avoid risks of unintentional removal of the terminal section. Regrettably in this case, a larger region than that of laser cut techniques is required. With a separation technique through cutting of a substrate per se, a groove is ordinarily formed by a scribing blade or laser beam and, thereafter, a pressure is applied for cutting the substrate in the region. In this case, separation is physically done completely; thus, risks of separation deficiency may be minimized. However, this advantage does not come without accompanying a penalty: an unintentional region can also be cut away; for example, scan line side common lines can be cut accidentally in some cases. Determining which one of the techniques should be used mainly depends on exact arrangements of manufacturing lines. In a view point of profit-maximum policy requiring increase in number of products per mother glass plate and also size maximization thereof, the use of laser cut techniques is recommendable because it attains these objects successfully. Additionally, although this process is unnecessary for the arrangement with SACL and scan signal lines being separated in advance, use of ASCL is desirable for perfectivity purposes, while the presence of scan line side common lines per se offers certain static electricity suppression effects.

After separation, let test probes PB come into contact with scan line side test terminals GLTP which are provided and connected to the scan line side common lines; then, input one or more test signals for inspection. Certain ones as judged as defects through this inspection Include repairable ones—e.g. those with defects curable through correction using a laser beam. Let these defective ones undergo repairing processes, and thereafter again subjected to inspection. If defects are repaired then such liquid crystal elements will be handled as good products. Thus it is possible to reduce rejection rates. Note here that one principal feature of the present invention lies in its enhanced applicabilities to unicolor test/inspection procedures. More specifically, in regard to continuous point defects or else at two neighboring pixels, any intended detection becomes unattainable if only the all-color simultaneous lighting scheme is supported. One example is that if a red pixel and its neighboring green pixel are short-circuited together then the judgment of "no abnormality" is made in the all-color simultaneous lighting event. On the other hand, with unicolor inspection scheme, if a red is turned on then not only a red pixel but also its neighboring green pixel will turn on simultaneously, resulting in judgment of presence of a bright point defect. As far as defect judgeabllity is available at this process step, any defect found is repairable by cutting a short-circuit portion between red and green pixels by use of a laser beam for example, thus permitting it to become a good product. However, in case only the all-color simultaneous lighting inspection is possible, such defect will no longer be detected until thereafter connection to drive circuitry at a later process step. To make correction at this stage, it is required that a polarization plate is once removed away if such polarization plate was attached; even in a case where such necessity is absent, the drive circuitry will possibly be destroyed during processes for transportation toward correction apparatus and repairing works. In either case the resulting production costs for repairing processes increase. Alternatively, other defects such as gap defects are induced during repairing processes, resulting in an increase in correction/repair failure rate. Consequently, the enhanced applicability or "accommodatabilty" to unicolor test/inspection at the stage of cells leads to significant advantages as to both manufacturing yields and production costs.

A substrate judged as a good product through inspection is then subject to separation between the scan line side common lines C1, C2, C3 and TCP's connection pads TCPD along LCT2. This separation is done through physical cutaway of the substrate per se. Accordingly LCT2 becomes one terminate end of the substrate in the state of a product therearound. Thereafter, as shown in FIG. 17(a), TCP is mounted; then, connect external drive circuitry and scan signal lines together.

Although the above explanation concerns the scan signal line side, an arrangement as to the video signal line side is shown in FIGS. 18(a) and 18(b), wherein the former corresponds to FIG. 17(a) whereas the latter to FIG. 17(b). Basic processes and ideas are the same as those discussed above.

In addition, as apparent from viewing FIG. 17(a) or FIG. 18(b), with the TCP scheme, in the state that a liquid crystal display device is completed, it is designable so that the arrangement for inspection based on the schemes and ideas of the present invention as disclosed herein does not reside even where these are applied thereto. However, this invention is inherently aimed at provision of the liquid crystal display device based on the above techniques or alternatively manufacturing methodology of such liquid crystal display device based on the above schemes and, without residence or "retention" as a hardware structure in final products, any available TCP scheme liquid crystal display devices as manufactured while incorporating the techniques or ideas of the invention as disclosed herein should be considered to fall within the scope and coverage of the present invention.

Figure 17:
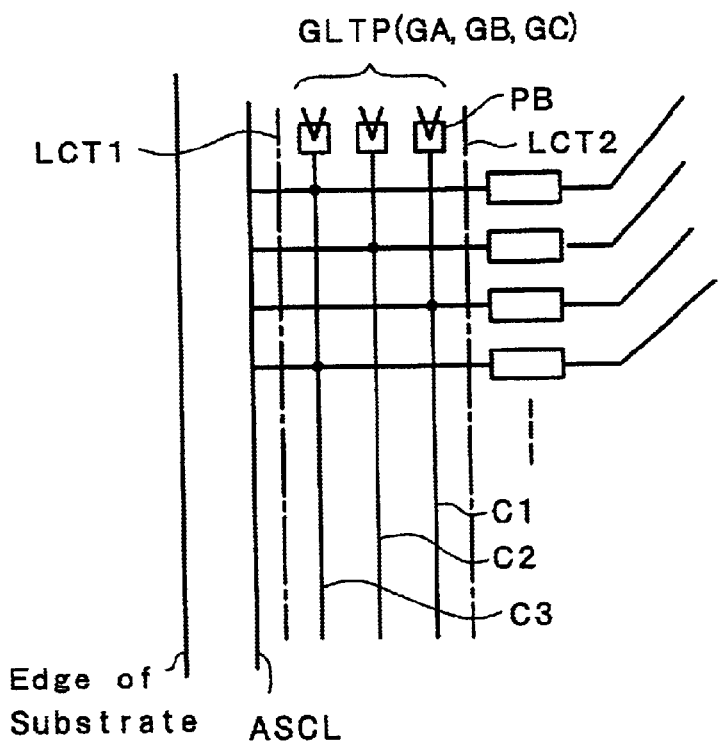
FIG. 17 is a pictorial representation diagram for explanation of a lead wiring pattern at main part of one embodiment of the liquid crystal display device in accordance with the invention.
Figure 17:
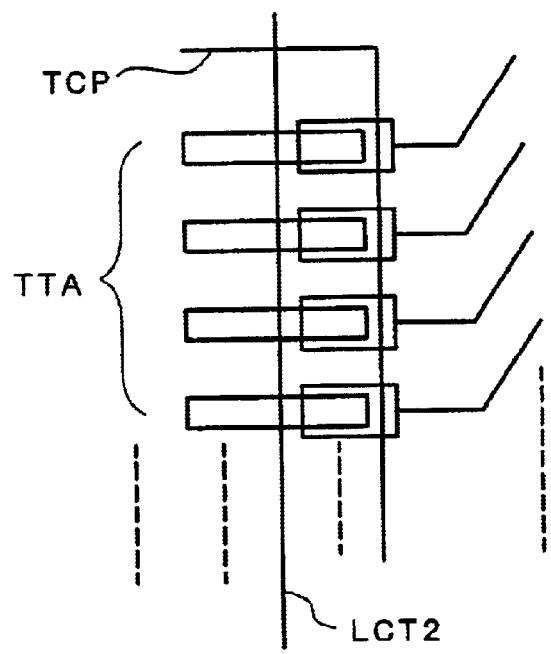
Figure 18:
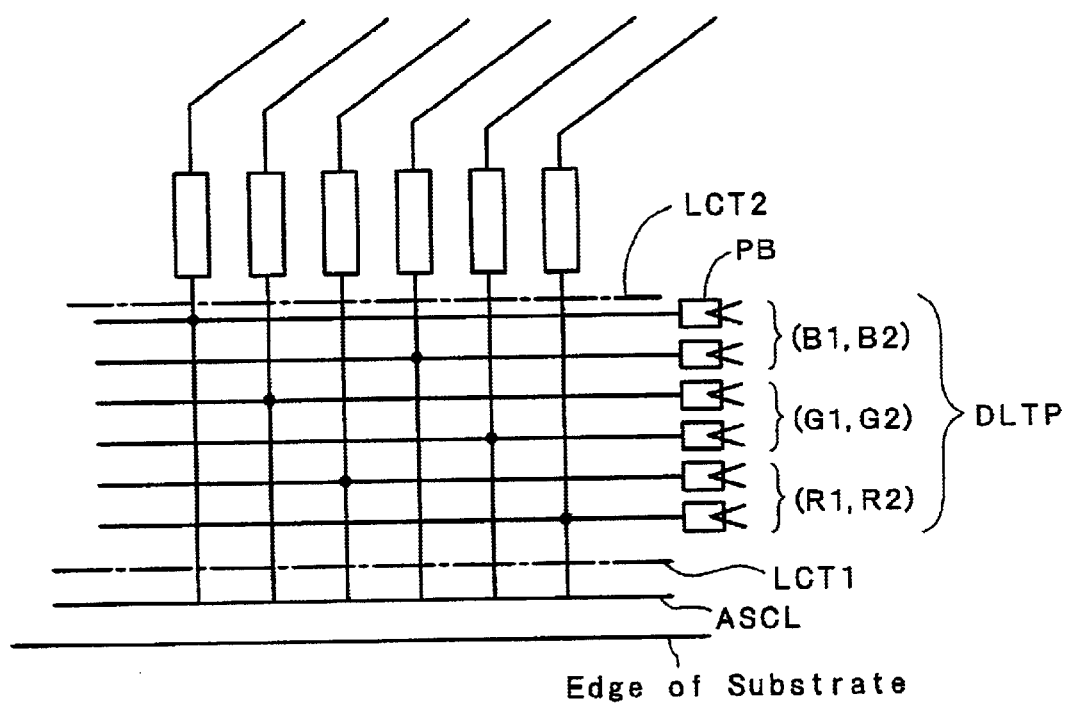
FIG. 18 is a pictorial representation diagram for explanation of a lead wiring pattern at main part of one embodiment of the liquid crystal display device in accordance with the invention.
Figure 18:
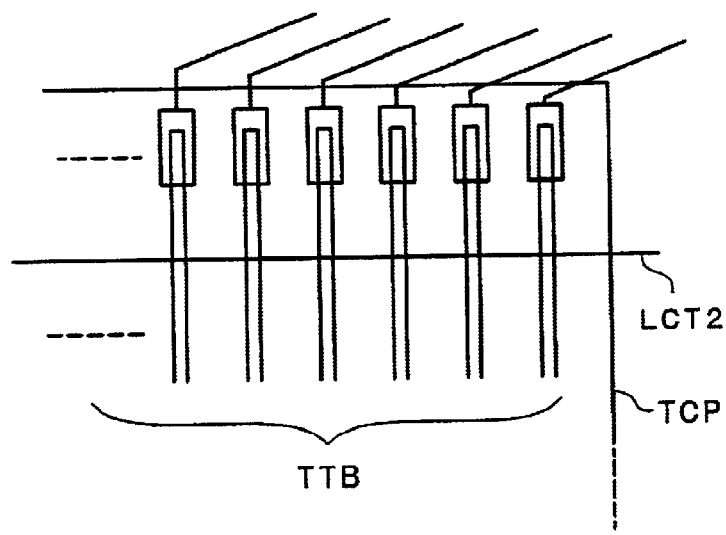

Additionally, although the explanation was made with the TCP scheme being as an example in FIGS. 17 and 18, an FCA scheme is substantially the same as the TCP scheme except that the former is different from the latter in that the substrate separation or "cutaway" process at LCT1 or LCT2 employs either one of laser light and etching in place of the physical cut technique. Note here that in the case of FCA scheme, there is a difference that judgment as to whether the liquid crystal display device of interest was manufactured by using the techniques and ideas of the invention as disclosed herein is relatively easy because of the fact that at least part of common lines is left at part of its substrate even after completion of such liquid crystal display device.

A test pad layout method will next be set forth in conjunction with an example with three common lines on the FCA's scan signal line draw-out side. In the TCP case the basic ideas remain identical. Additionally the same ideals can be applied even when the common lines used become different in number.

Figure 19:
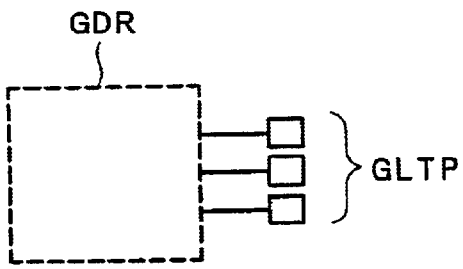
FIG. 19 is a diagram showing pictorial views each for explanation of a test pad layout pattern of one embodiment of the liquid crystal display device in accordance with the invention.
Figure 19:
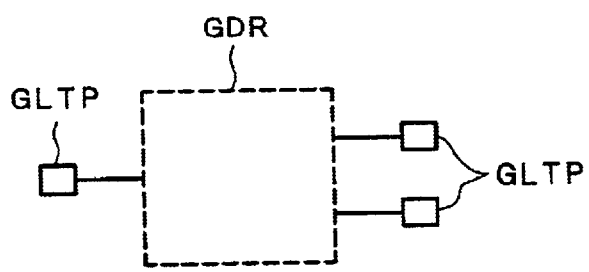
Figure 19:
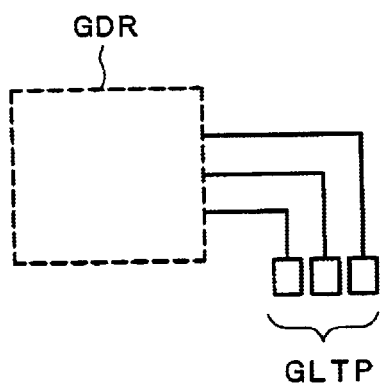
Figure 19:
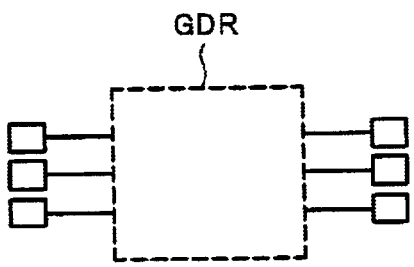

FIG. 19(a) shows an example in which gate driver side test pads GLTP are provided on one side of a single chip GDR or alternatively provided in a certain region with an ensemble of terminals laid out therein if in the TCP case, wherein manufacturing of probes PB is made easier. Next, FIG. 19(b) is an example with an alternate layout, wherein it becomes possible to provide an arrangement for enlarging test pads GLTP on a per-pad basis, which in turn makes it possible to facilitate position alignment of probes PB while at the same time reducing a test/inspection time period required. FIG. 19(c) is an example with the test pads GLTP provided in a different region from the scan line side common line draw-out region. With such an arrangement, design flexibilities in both layout and size increases. FIG. 19(d) is an example with the test pads provided on both sides. With this arrangement, it is possible to suppress unwanted waveform rounding of test signals as supplied from scan line side common lines toward scan line, thereby permitting achievement of tests closer to real drive states.

Figure 20:
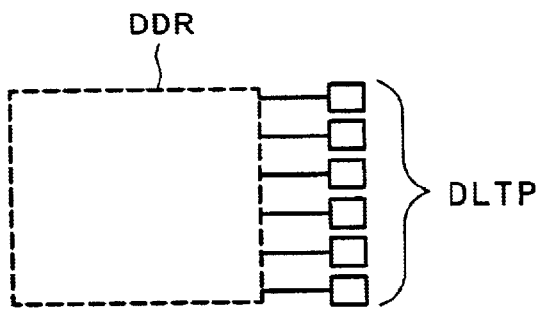
FIG. 20 is a diagram showing pictorial views each for explanation of a test pad layout pattern of one embodiment of the liquid crystal display device in accordance with the invention.
Figure 20:
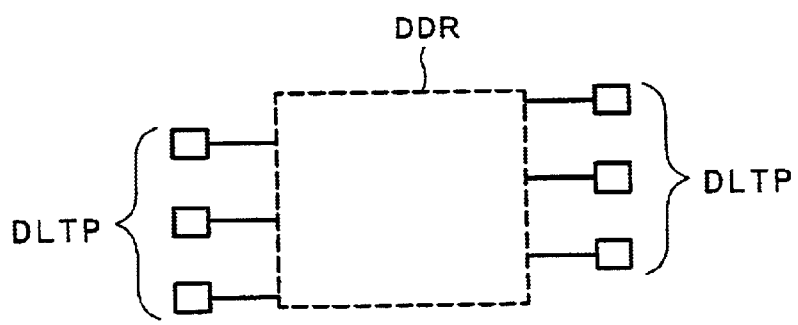
Figure 20:
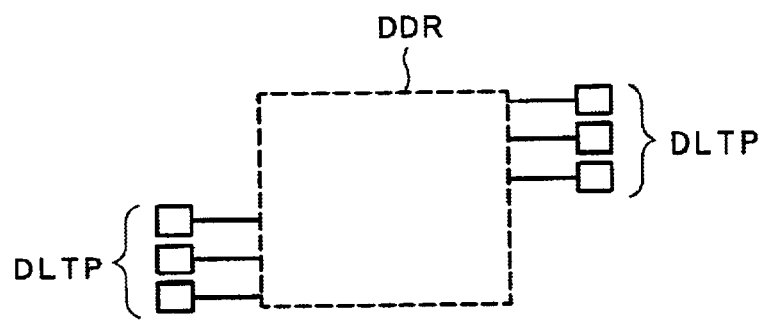
Figure 20:
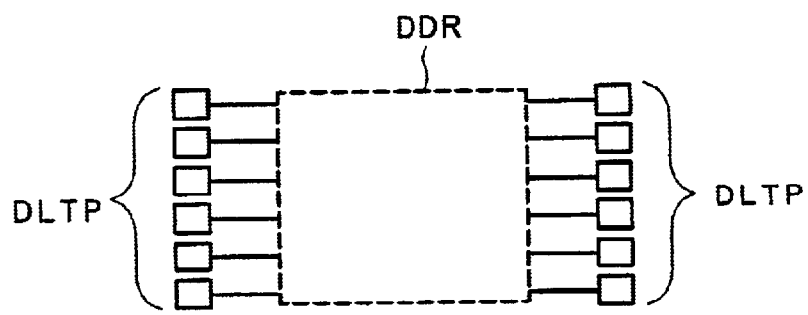

The video signal draw-out side is the same in idea as the scan signal line drawout side. Several example of the case of using six signal line side common lines are shown in FIG. 20. FIG. 20(a) shows an example with the test pads PB arranged on one side. FIG. 20(b) is an example with an alternate draw-out on the opposite sides. An increase in number of PB results in an increase in merits for position alignment accuracies due to enlargement of size of GLTPs when compared to the case of FIG. 19. FIG. 20(c) is an example with GLTPs arranged in units of positive and negative polarities. FIG. 20(d) is an example with both-side arrangement.

Several examples of the GLTP layout in a multiple chip mount region if in the FCA case or in a region spanning a plurality of regions each including an ensemble of terminals if in the TCP case will next be explained below, with a scan line side region in FCA being as an example, along with some examples thereof. Obviously the same ideas are applicable in case the common lines are different in number and to the drain side also, and the following explanation is devoted to mere examples thereof.

Figure 21:
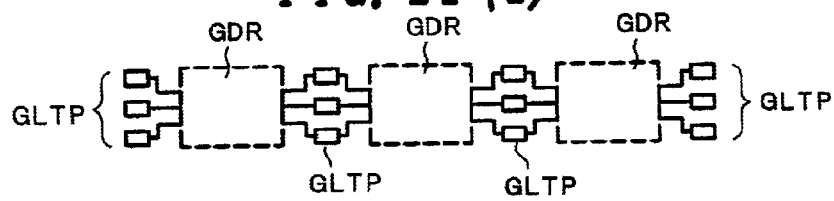
FIG. 21 is a diagram showing pictorial views each for explanation of a test pad layout pattern of one embodiment of the liquid crystal display device in accordance with the invention.
Figure 21:
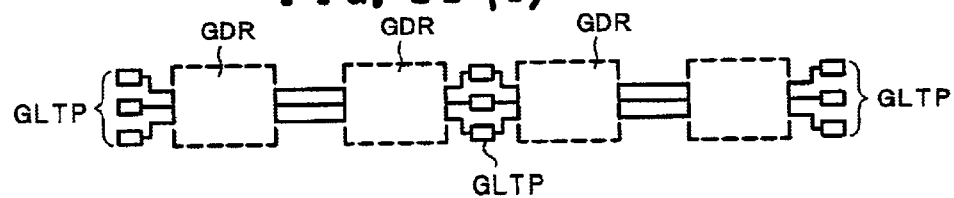
Figure 21:
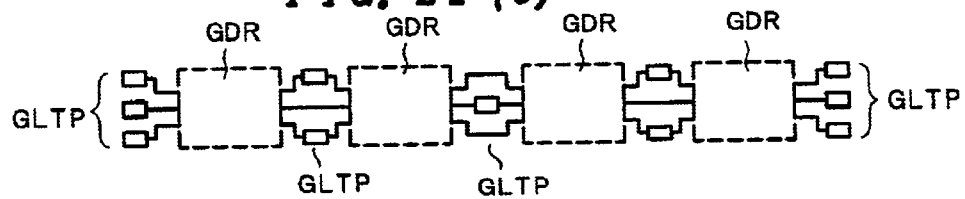
Figure 21:
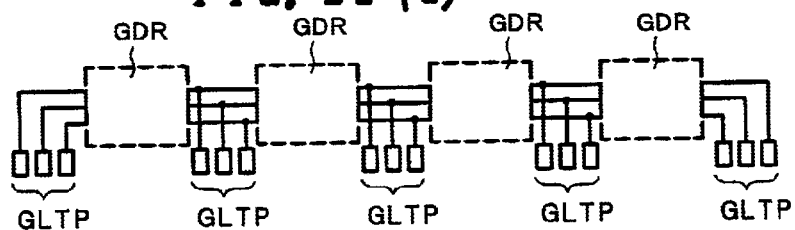
Figure 21:
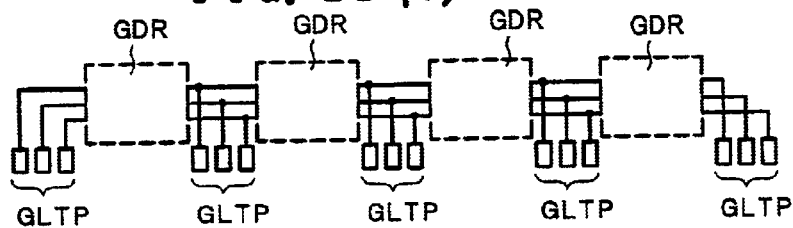
Figure 21:
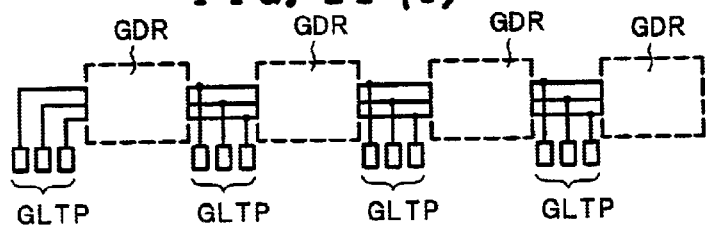

FIG. 21(a) shows an example in which gate driver side test pads GLTP are laid out on the opposite sides of each scan drive IC mount region GDR. In this case, it is possible to minimize power-feed resistivity, thus enabling achievement of tests closer to real drive states. FIG. 21(b) shows an example with GLTPs provided in units of groups each including a plurality of GDRs. In this case the requisite number of probes may be reduced resulting in a decrease in probe production costs. FIG. 21(c) is an example in which GLTPs are provided alternately with respect to a plurality of signal line side common lines between adjacent ones of multiple GDRs. In this case it is possible to reduce probe costs and also increase the area of GLTP per single one. FIG. 21(d) is the one with GLTPs formed in a region outside a signal line side common line formation region. Whereby It becomes possible to increase design flexibilities while simultaneously facilitating probe position alignment. Additionally with this arrangement, it becomes possible, by specifically designing GLTPs in such a manner as to have identical pitches with respect to one edge face on a substrate, to commonly use probes among a variety types of products with different terminal layout pitches, thus enabling reduction in number of test/inspection equipment and also reduction in probe costs. FIG. 21(e) is the one with modification in the railing pattern of leads from GDR's signal line side common lines at one end to GLTPs. In the arrangement of FIG. 21(d), only a single one nearest to an edge will be reversed from the other portions in layout of terminals within GLTPs. Use of the arrangement of FIG. 21(e) avoids this risk, which will be advantageous especially for achievement of probes with applicabilities to multi-type products. Alternatively, a case in which GLTPs per se are eliminated at portions reversed from the other portions in FIG. 21(d) is shown in FIG. 21(f). In this case, similar results to FIG. 21(e) are obtainable while permitting probe number reduction; unfortunately, the resultant signal power feed is from one-side only for the GDRs so that it suffers from a problem that pixel regions pertaining to the GDRs become relatively lower in accuracy, in particular as to flicker, than the remaining regions.

Next, further examples and ideas will be shown below in conjunction with the drains by way of example.

Figure 22:
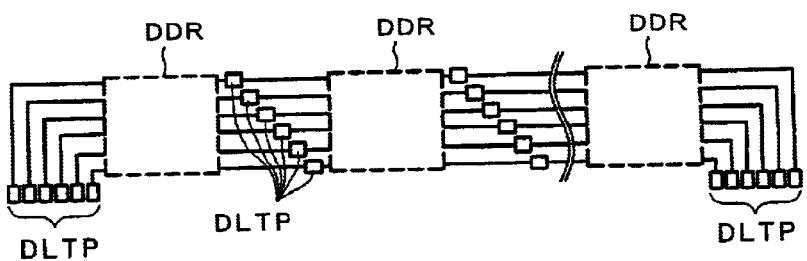
FIG. 22 is a diagram showing pictorial views each for explanation of a test pad layout pattern of one embodiment of the liquid crystal display device in accordance with the invention.
Figure 22:
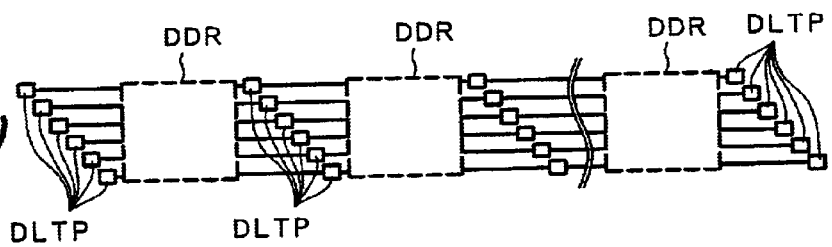
Figure 22:
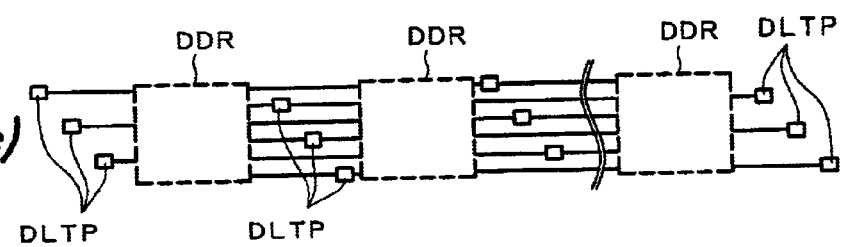
Figure 22:
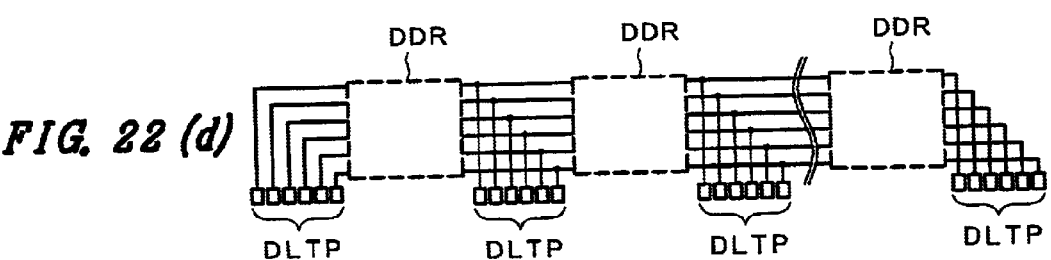
Figure 22:
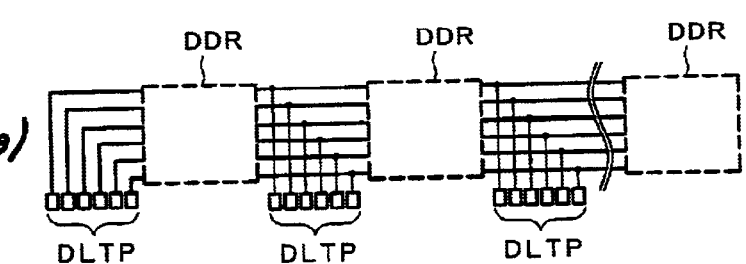
Figure 22:
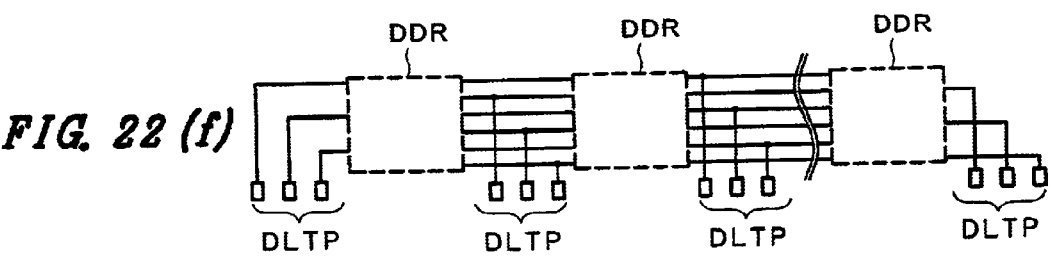

FIG. 22(a) shows an example of drain driver side test pads for signal drive IC mount regions DDR. DLTPs are disposed so that they are shifted in position between DDRs. With such an arrangement, it becomes possible to enlarge the area of each test pad DLTP, thus making easier positioning of PBs. FIG. 22(b) shows the one that employs similar layout for DLTPs on an edge face. In this case, a probe unit may be constituted from a plurality of probes of the same arrangement, thus enabling reduction of probe production costs. FIG. 22(c) is an arrangement similar to that of FIG. 22(b) with an idea added thereto for alternately arranging DLTPs in units of signal line side common lines. With this example, it is possible to enlarge DLTP per single one. Especially the drain side is greater in line number than the gate side, and its increase amount is greater than that of aspect ratio of liquid crystal display device; thus, the distance or interval between chips on the drain side becomes narrower than that of the gate side. Thus it becomes difficult in some cases to provide sufficient surface areas used for DLTP formation. Even in such case, use of the arrangement of FIG. 22(c) makes it possible to attain the intended DLTP layout. FIG. 22(d) is the one incorporating the same ideas to those of FIG. 21(d), wherein DLTPs are formed in a region that is out of the scan line side common line formation region. An arrangement for removal of DLTPs on the edge face based on the same ideas as FIG. 21(f) is shown in FIG. 22(e). The arrangement of FIG. 22(f) Is based on the same ideas as FIG. 21(e).

Flicker inspection accuracy is variable depending upon the influence of a very small voltage difference between pixels; thus, it is required to control any possible delays of signal waveforms during inspection. Thus, it is desirable that an increased number of test pads for input of test signals to signal line side common lines be provided with respect to each signal line, which number is given as (n−1)/2 or more where "in" is the number of pads per unit region, which may be a chip mount region or alternatively a region with an ensemble of signal wiring leads provided therein. In addition, to suppress probe cost increases, it is desirable that the pad number be set at 2×(n+1) or less. The respective types of examples stated above are the ones that are disclosed while incorporating this idea also.

It is also desirable that the number of test signal terminals for inputting test signals to scan signal lines is greater than the number of test signal terminals for input of test signals to video signal lines. This is based on a requirement for reducing input resistivities of the video signal line side while taking account of the fact that execution of the intended test/inspection with the above-noted arrangements requires that the input frequencies of certain test signals to be applied to the video signal lines during inspection be higher than or equal to input frequencies of test signals being applied to the scan signal lines.

In addition, advantages as to lower resistivities are obtainable by providing a region formed of a specific wiring layer with the lowest resistivity in the liquid crystal display device at any one of those wiring leads associated with the signal line side common lines or alternatively between the signal line side and test pads and leads associated with the scan line side common lines or between the scan line side common lines and test pads.

An example for further reduction of the test pad number will next be set forth below. Although the gate side will be explained as an example, the same ideas are also applicable to the drain side—additionally, the same ideas are applicable even with TCP. As a representative of these, the gate side of FCA will be explained as one example.

Figure 23:
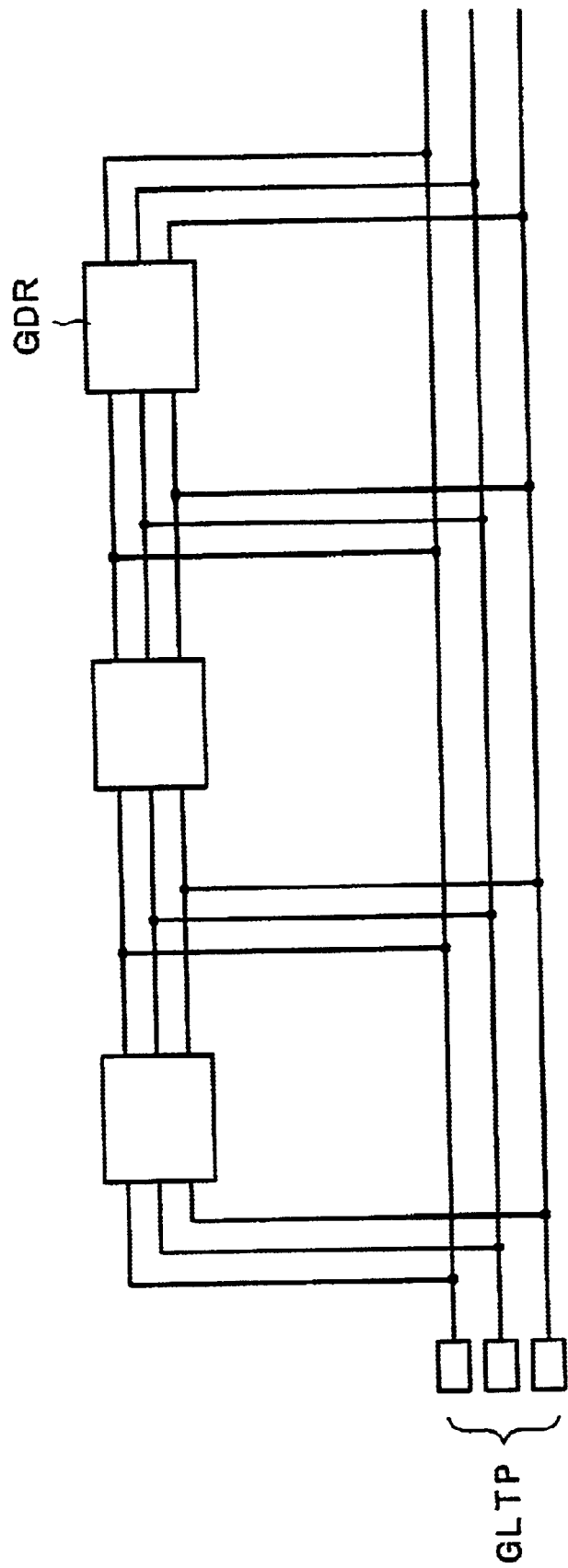
FIG. 23 is a diagram showing pictorial views each for explanation of a test pad layout pattern of one embodiment of the liquid crystal display device in accordance with the invention.

FIG. 23 shows an example wherein wiring leads as drawn out of more than one signal line side common line are provided causing a respective one of such draw-out wiring leads to be connected to a different common line with GLTPs arranged at least at selected ends thereof. With such an arrangement, it becomes possible to reduce the requisite number of GLTPs to the extent that it is equal to the number of scan line side common lines if on the gate side or to the number of signal line side common lines if on the drain side.

Thus it is possible to noticeably reduce probe production costs while at the same time shortening a test time period due to an ability to facilitate the position alignment of probes used.

However, it is inevitable for this arrangement that a waveform delay occurring due to influence of electrical lead resistivities is degraded when compared to the case of providing a great number of GLTPs. To suppress such influence, it is desirable that the different common line be designed to at least partly have a layer of specific material of the lowest resistivity among parts in the liquid crystal display device or alternatively a layer of the same material with its resistivity made lower than within-the-pixel leads by widening the line width thereof.

Next shown is a scheme for efficiently performing cutting along LCT1, in particular an idea of an arrangement that is capable of efficiently doing such process by use of a laser beam along with one example thereof.

Figure 24:
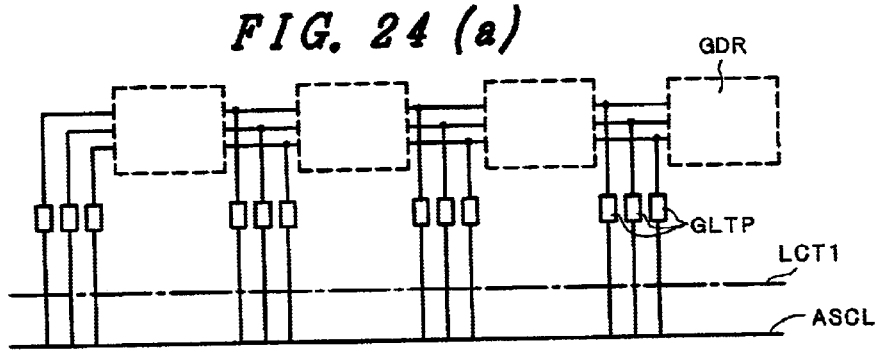
FIG. 24 is a diagram showing pictorial views each for explanation of a test pad layout pattern of one embodiment of the liquid crystal display device in accordance with the invention.
Figure 24:
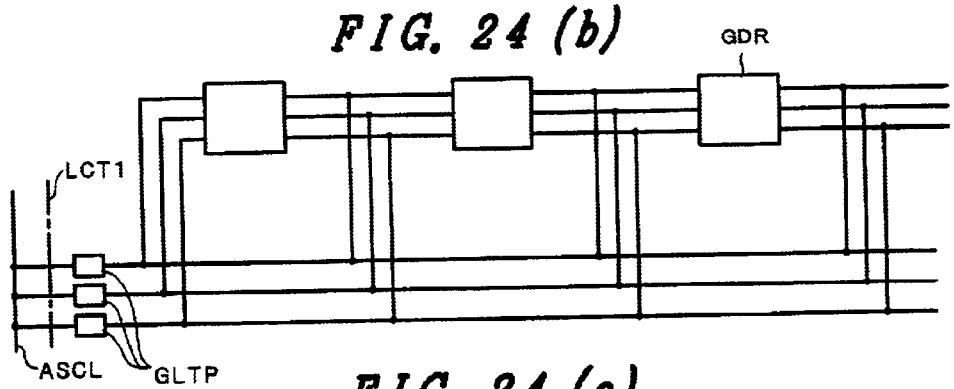
Figure 24:
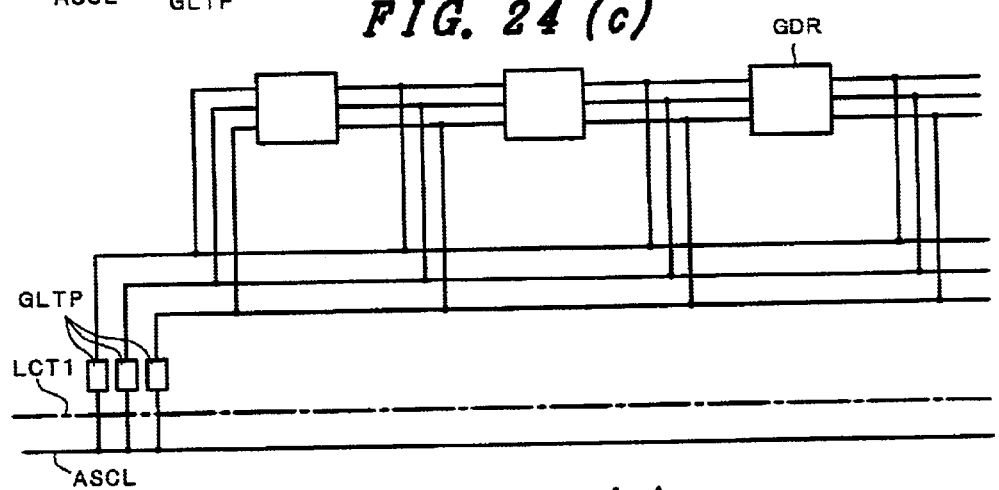
Figure 24:
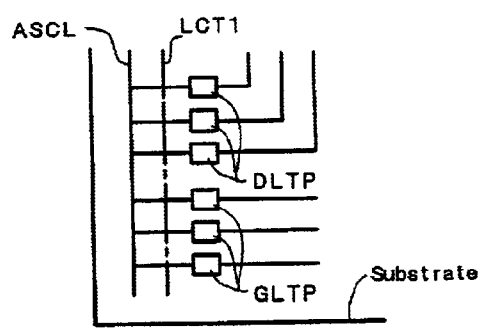

FIG. 24(a) shows the state before the embodiment structure of FIG. 21(f) is cut along LCT1, i.e. the test pads are connected to ASCL. Separation using a laser beam is ordinarily done in a way such that an optical system of the laser beam is fixed while letting a substrate move. This is because of the fact that while the optical system associated with the laser beam is precise so that deviation can take place in the optical system when it is moved frequently, causing an optical axis of laser light to be likewise deviated or offset resulting in accidental cutaway of portions other than a specified region. In addition, repair in such case is also precise and thus requires a lengthened time period; in view of this, the laser beam is fixed while letting the substrate side move. In this case, a time taken for separation may be shortened if an increased clearance is present between the region to be cut and the region that must not be cut. This can be said because movement is done by mechanical mechanisms and that in case the substrate is moved more quickly the resultant offset due to such movement tends to likewise increase. Then, forming the LCT1 region outside a chip region makes it possible to expand the clearance region; thus it is possible to shorten the time required for separation using laser light accordingly, thus enabling improvement of throughputs and yields plus costs. Further, forming a cut region linearly permits achievement of higher speed performance.

FIG. 24(b) shows an example with the GLTP number reduced as in FIG. 23 and with LCT1 provided at its distal end part. It is possible to reduce the length of the region to be cut, thus enabling significant decrease in time period. FIG. 24(c) is another example different in GLTP position from that of FIG. 24(b). FIG. 24(d) is a further example applying the idea of FIG. 23 to both the scan line side and the gate line side while designing GLTP and DLTP so that these are disposed concentrically. With such an arrangement, a further time reduction is possible. Especially in the case of concentrated layout at an edge portion of the substrate, the intended LCT1 separation may be achieved only by a one dimensional cutting process with the substrate as a whole; thus, position alignment of the substrate for laser cutting is completed through a single trial, thereby shortening a time required. Additionally the arrangement with test pads concentrated along one side in the way discussed above offers many advantages including abilities to readily realize production of probes for common use with multiple products as shown in FIG. 2 and to make probe positioning easier.

Figure 25:
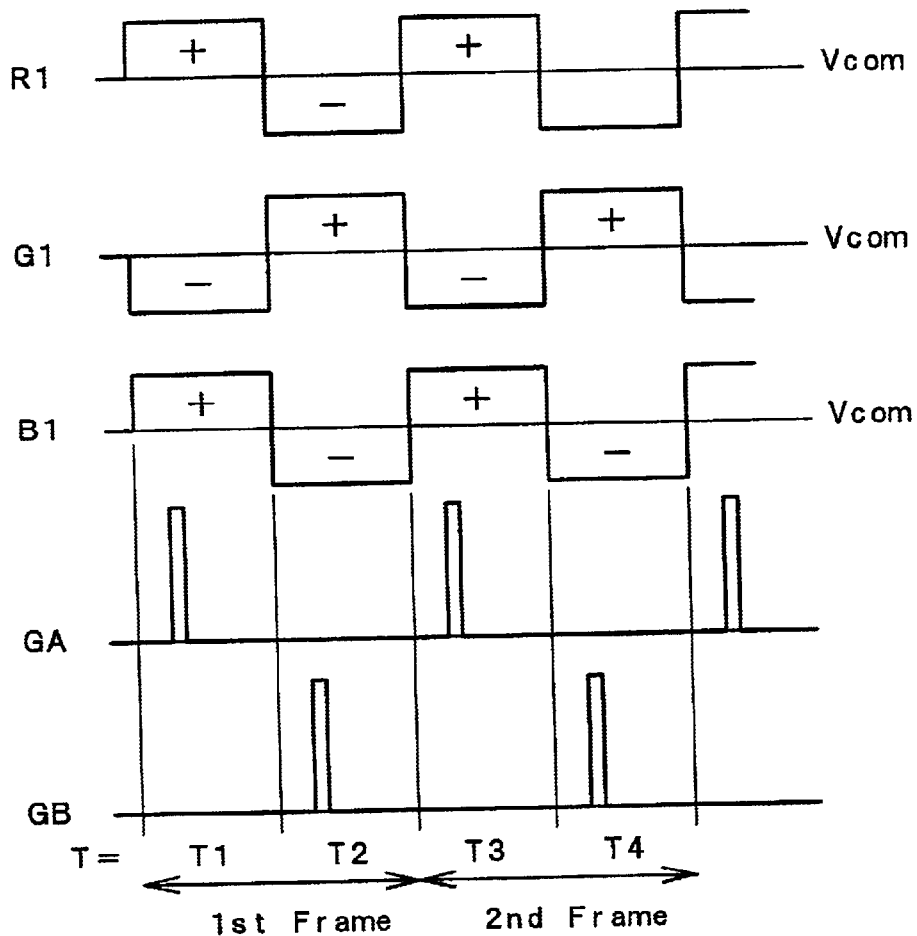
FIG. 25 is a diagram showing pictorial views for explanation of test signals of one embodiment of the liquid crystal display device in accordance with the invention.

Next, ideas and examples concerning signal waveforms during the test procedure will be shown. FIG. 25 shows examples in case the signal line side common lines on the drain side are formed of three lines for the three primary colors RGB respectively whereas the scan line side common lines consist of two lines. An explanation will be given with a dot inversion drive being as an example. FIG. 25(a) shows a concept of drive waveform; FIGS. 25(b) and 25(c) show certain pixels' polarities relative to a reference voltage potential Vcom, which pixels correspond to six adjacent cells as constituted from RGBs and first and second scan lines in first and second frames at this time.

As apparent from comparing FIGS. 25(b) and (c), with this arrangement, voltage potentials of the same polarity are always applied to the pixels, resulting in degradation of liquid crystals.

Test waveforms remedying this are shown in FIG. 26. As shown in FIG. 26(a), let the frequency of a signal as input to a video signal line be ½ of that of FIG. 25(a). Whereby it is possible to invert the pixel polarity between the first and second frames as shown in FIGS. 26(b) and 26(c), thus making it possible to prevent DC components from mixing into liquid crystals.

FIG. 27 shows a case in which two lines of positive and negative polarities are formed in units of RGBs as the signal line side common lines on the drain side, resulting in provision of six lines in total.

With this arrangement, it is possible to realize a standard dot inversion drive state wherein the voltage potentials of the pixels in the first and second frames as shown in FIGS. 27(b) and 27(c) are mutually inverted in units of frames while at the same time causing inversion between neighboring pixels in any events. Thus it is possible to realize flicker inspection with high accuracies near real in-use states.

FIG. 28 shows one example of the case of common inversion.

In this case, use of three signal line side common lines for RGB respectively and two scan line side common lines results in realization of a line inversion drive scheme, the first frame and second frame of which are shown in FIGS. 28(b) and 28(c) respectively. Accordingly, in the case of common inversion, employing three signal line side common lines and two scan line side common lines makes it possible to realize flicker tests with higher accuracies near real use states.

FIG. 29 is an example in case the scan line side common lines consist of three lines in the arrangement of FIG. 27.

In this case, driving is attainable by three lines at the front, self and rear states as stated previously as the explanation on Cadd; thus it is possible to perform tests while letting the influence of "jumping" voltages at TFTs be in the state closer to final products. However, this suffers from a disadvantage as to the incapability to provide complete dot inversion due to the fact that GA and GC become the same in polarity as each other.

FIG. 30 shows another scheme for preventing harmful DC application to pixels of FIG. 25, which offers similar effects to FIG. 26. Additional advantages are as follows: these effects in this arrangement are obtainable by use of a single line for the individual one of RGB; and, if two lines for use as the positive and negative polarities are provided in units of RGBs then the intended flicker remedy is also realized simultaneously.

With the illustrative arrangement, the frequency of video signal lines are designed to be earlier than that of FIG. 25(a) as shown in FIG. 30(a) while writing a voltage to a pixel with GA, GB set at "high" level at a timing permitting application of signals of opposite polarities in the first frame and second frame whereby DC superimposition is precluded, the first and second frames of which are shown in FIGS. 30(a) and (c) respectively.

FIG. 31 shows a set of test signal waveforms for dot inversion driving as believed to be the best mode when totally taking into consideration the test accuracies and probe costs plus LCD panel frame plate size reduction, wherein the signal line side common lines on the drain side consist of six lines in total—i.e. three positive polarity lines for respective colors of RGB plus three negative polarity lines therefor. In addition the scan line side common lines on the gate side consist of four lines for enabling constant retainment of the front, self and rear stages while also realizing flicker suppression. Drive waveforms are shown in FIG. 31(a). Whereby the pixel polarities in the first and second frames become as shown in FIGS. 31(b) and 31(c) respectively, thereby enabling realization of the intended dot inversion with polarity inverted between neighboring pixels. Obviously no problems occur even when this is used for common inversion. With a liquid crystal display device having such common lines capable of realizing tests based on these waveforms or the inspection scheme thereof, it is possible to realize a sufficient test or inspection procedure while at the same time achieving higher accuracies with a reduced number of test pads during dot inversion driving. In addition, forming probes into the form adaptable for use with this arrangement makes it possible to apply the same to not only dot inversion but also common inversion, thus enabling provision of test apparatus or equipment with enhanced applicabilities.

As has been explained above, according to the present invention, it is possible to enlarge the width and length plus pitch of test pads being connected to signal line leads of a liquid crystal display device for connection to drain drivers and gate drivers, thereby making easier production of probes used for electrical open-circuit tests and turn-on or "lighting" tests even in the case of using the drivers of high-precision display while simultaneously improving test accuracies due to an ability to take accurate contacts between the probes and test pads, which in turn makes it possible to provide an improved liquid crystal display device with increased reliability.

What is claim is:

1. A liquid crystal display device including,
a pair of substrates with a liquid crystal layer interposed therebetween, one of said substrates having thereon a matrix array of thin-film transistors, pixel electrodes as driven by the thin-film transistors, and a pattern of scanning lines and signal lines for supplying the thin-film transistors with voltage signals used for pixel formation, a remaining one of said substrates having color filters of three colors of red and green plus blue, the one substrate also having a peripheral side with scan line lead terminals provided and another peripheral side with signal line lead terminals provided;
a scan line drive IC mount region and a signal line drive IC mount region having output terminals connected to respective ones of said scan line lead terminals and said signal line lead terminals of the liquid crystal panel while permitting direct mount of more than one scan line drive IC and more than one signal drive IC respectively; and more than one static electricity suppression common line provided in a cut removal region for commonly connecting said scan line lead terminals and signal line lead terminals together, characterized by comprising:

six signal line side common lines provided in the signal line drive IC mount region of the signal line lead terminals connected to said static electricity suppression common line, for connection with six terminal groups as divided from the signal line lead terminals in a way such that the groups are of positive polarity of red, negative polarity of red, positive polarity of green, negative polarity of green, positive polarity of blue, and negative polarity of blue; and test pads provided on said one substrate in an area excluding said signal line drive IC mount region for connection to said six signal line side common lines.

2. The liquid crystal display device as recited in claim 1, characterized in that the test pads of said six signal line side common lines are disposed in the cut removal region of sold one substrate.

3. A liquid crystal display device including:

a pair of substrates with a liquid crystal layer interposed therebetween, one of said substrates having thereon a matrix array of thin-film transistors, pixel electrodes as driven by the thin-film transistors, and a pattern of scanning lines and signal lines for supplying the thin-film transistors with voltage signals used for pixel fomation, a remaining one of said substrates having color filters of three colors of red and green plus blue, the one substrate also having a peripheral side with scan line lead terminals provided and another peripheral side with signal line lead terminals provided;

a scan line drive IC mount region and signal line drive IC mount region having output terminals connected to respective ones of said scan line lead terminals and said signal line lead terminals of the liquid crystal panel while permitting direct mount of more than one scan line drive IC and more than one signal drive IC respectively; and more than one static electricity suppression common line provided in a cut removal region for commonly connecting said scan line lead terminals and signal line lead terminals together, characterized by comprising;

three or four scan line side common lines provided in the scan line drive IC mount region of the scan line lead terminals as connected to the static electricity suppression common line, for connection with three groups being divided from the scan signal line lead terminals and having a front stage and next stage plus rear stage or alternatively four terminal groups as divided therefrom in order to change polarities in units of dots;

six signal line side common lines provided in the signal line drive IC mount region of the signal line lead terminals connected to said static electricity suppression common line, for connection with six terminal groups as divided from the signal line lead terminals in a way such that the groups are of positive polarity of red, negative polarity of red, positive polarity of green, negative polarity of green, positive polarity of blue, and negative polarity of blue; and test pads provided on said one substrate in an area excluding said scan line drive IC mount region and said signal line drive IC mount region for being associated with said three or four scan line side common lines and said six signal line side common lines respectively.

4. The liquid crystal display device as recited in claim 3, characterized in that test pads of said three or four scan line side common lines and said six signal line side common lines are disposed in the cut removal region of said one substrate.

5. The liquid crystal display device as recited in claim 3, characterized in that test pads of said three or four scan line side common lines and said six signal line side common lines are laid out with equal intervals in the cut removal region of said one substrate.

6. The liquid crystal display device as recited in claim 3, characterized in that said remaining substrate has thereon more than one counter electrode, that the test pads of said three or four scan line side common lines and said six signal line side common lines are disposed in the cut removal region of said one substrate, and that a test pad for connection to a lead line of the counter electrode is disposed along with the test pads of said three or four scan line side common lines and said six signal line side common lines.

7. The liquid crystal display device as recited in claim 3, characterized in that said one substrate has thereon more than one counter electrode, that the test pads of said three or four scan line side common lines and said six signal line side common lines are disposed in the cut removal region of said one substrate, and that a test pad for connection to a lead line of the counter electrode is disposed along with the test pads of said three or four scan line side common lines and said six signal line side common lines.

8. A liquid crystal display device including:

a pair of substrates disposed opposing each other with a layer a liquid crystal material interposed therebetween;

color filters of three colors of first, second and third colors as provided on one substrate or a remaining substrate of said substrates;

a plurality of image signal lines and a plurality of scan signal line disposed on the one substrate of said substrates to have a matrix form, two neighboring lines of said plurality of image signal lines and two neighboring lines of said plurality scan signal lines crossing over each other to thereby define a plurality of pixel regions; and each of said pixel region having at least one thin-film transistor along with a pixel electrode for receiving a voltage as input from a corresponding one of said image signal lines for control of display of any one of said first, second and third colors, said image signal lines having image signal line ad terminals are provided integrally or separately in a region being extended to outside of said liquid crystal layer of one substrate along at least one peripheral side of this substrate, characterized by comprising:

a first signal line common line, second signal line common line, third signal line common line, fourth signal line common line fifth signal line common line and sixth signal line common line on at least said one substrate;

said first signal line common line being connected to a connected to a corresponding one of said image signal lead terminals as provided integrally or separately at an image signal line relative to displaying of said first color;

said second signal line common line being connected to a corresponding one of said image signal lead terminals as provided integrally or separately at an image signal line relative to display of said second color;

said third signal line common line being connected to a corresponding one of said image signal lead terminals as provided integrally or separately at an image signal line relative to display of said third color;

said fourth signal line common line being connected to a remaining one of said image signal lead terminals as provided integrally or separately at an image signal line relative to display of said first color;

said fifth signal line common line being connected to a remaining one of said image signal lead terminals as provided integrally or separately at an image signal line relative to display of said second color; and said sixth signal line common line being connected to a remaining one of said image signal lead terminals as provided integrally or separately at an image signal line relative to display of said third color:

wherein said signal line common lines have more than one test pad in at least one test pad provided region other than at least one region for mounting a drive IC; and wherein said test pads are provided almost in units of said drive ICs, and that when letting a number of said drive ICs be represented by "n," a number of said test pad provided regions is greater than or equal to $(n-1)/2$ and yet less than or equal to $2\times(n+1)$.

9. The liquid crystal display device as recited in claim 8, characterized by having at least two test pad provided regions which are substantially equal in test pad layout to each other.

10. The liquid crystal display device as recited in claim 8, characterized in that said test pad provided regions are disposed with substantially equal intervals.

11. A liquid crystal display device including:

a pair of substrates disposed opposing each other with a layer of liquid crystal material interposed therebetween;

color filters of three colors of first, second and third colors as provided on one substrate or a remaining substrate of said substrates;

a plurality of image signal lines and a plurality of scan signal lines disposed on the one substrate of said substrates to have a matrix form, two neighboring lines of said plurality of image signal lines and two neighboring lines of said plurality of scan signal lines crossing over each other to thereby define a plurality of pixel regions;

each of said pixel regions having at least one thin-film transistor along with a pixel electrode for receiving a voltage as input from a corresponding one of said image signal lines for control of display of any one of said first, second and third colors; and said scan signal lines having scan signal line lead terminals as provided integrally or separately in a region being extended to outside of said liquid crystal layer of one substrate along at least one peripheral side of this substrate, characterized by comprising:

two, three or four signal line common lines at least on said one substrate; and said signal line common lines being connected to any one of said scan signal line lead terminals as provided integrally or separately at said scan signal lines while causing neighboring signal line common lines to be connected to different scan signal lead terminals of mutually neighboring scan signal lines:

wherein said signal line common lines have more than one test pad in at least one test pad provided region other than at least one region for mounting a drive IC; and wherein said test pads are provided almost in units of said drive ICs, and that when letting a number of said drive ICs be represented by "n," a number of said test pad provided regions is greater than or equal to $(n-1)/2$ and yet less than or equal to $2\times(n+1)$.

12. The liquid crystal display device as recited in claim 11, characterized by having at least two test pad provided regions are substantially equal in test pad layout to each other.

13. The liquid crystal display device as recited in claim 11, characterized in that said test pad provided regions are disposed with substantially equal intervals.

* * * * *